United States Patent [19]

Ohhashi

[11] Patent Number: 4,495,645
[45] Date of Patent: Jan. 22, 1985

[54] COMPUTED TOMOGRAPHY DEVICE

[75] Inventor: Akinami Ohhashi, Omiya, Japan

[73] Assignee: Tokyo Shibaura Denki Kabushiki Kaisha, Kawasaki, Japan

[21] Appl. No.: 347,334

[22] Filed: Feb. 9, 1982

[30] Foreign Application Priority Data

Feb. 12, 1981 [JP] Japan .................................. 56-19476

[51] Int. Cl.³ .......................... A61B 6/00; G06F 15/42
[52] U.S. Cl. .......................................... 382/6; 378/4; 364/414
[58] Field of Search .................... 382/6; 364/414, 728, 364/819, 820, 822-823; 378/4, 9, 15, 901, 23

[56] References Cited

U.S. PATENT DOCUMENTS

| 4,144,457 | 3/1979 | Albert | 364/414 |
| 4,293,912 | 10/1981 | Walters | 382/6 |
| 4,339,799 | 7/1982 | Abele et al. | 382/6 |
| 4,379,329 | 4/1983 | LeMay | 364/414 |

FOREIGN PATENT DOCUMENTS 2260976 9/1975 France .

OTHER PUBLICATIONS

Holden et al., "Continuous Time-Dependence in Computed Tomography", *Medical Physics*, vol. 5, No. 6, Nov./Dec. 1978.

*Primary Examiner*—Leo H. Boudreau
*Attorney, Agent, or Firm*—Cushman, Darby and Cushman

[57] ABSTRACT

A computed tomography device comprising a subtraction unit which obtains differential data strings representing the difference between each time-serial projection data string of a group of projection data strings corresponding to a prospective reconstruction image generated by projection data strings acquired by a data acquisition system, a convolution unit which convolves each time-serial projection data string of the group of projection data strings corresponding to the prospective reconstruction image, and a back-projection unit which back-projects the convolved data strings.

16 Claims, 48 Drawing Figures

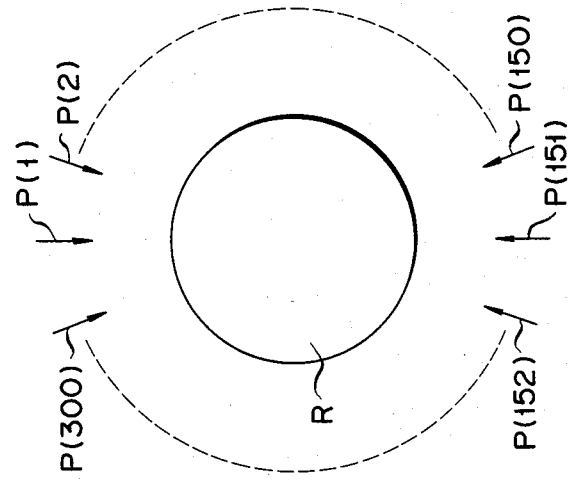
F I G. 2
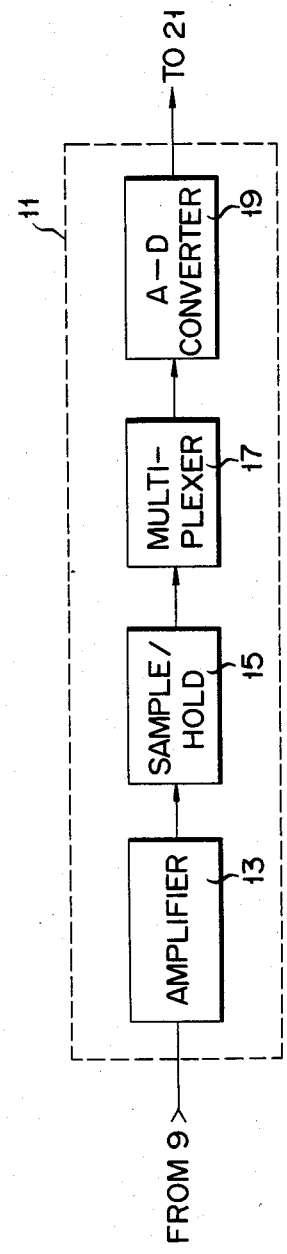
F I G. 4

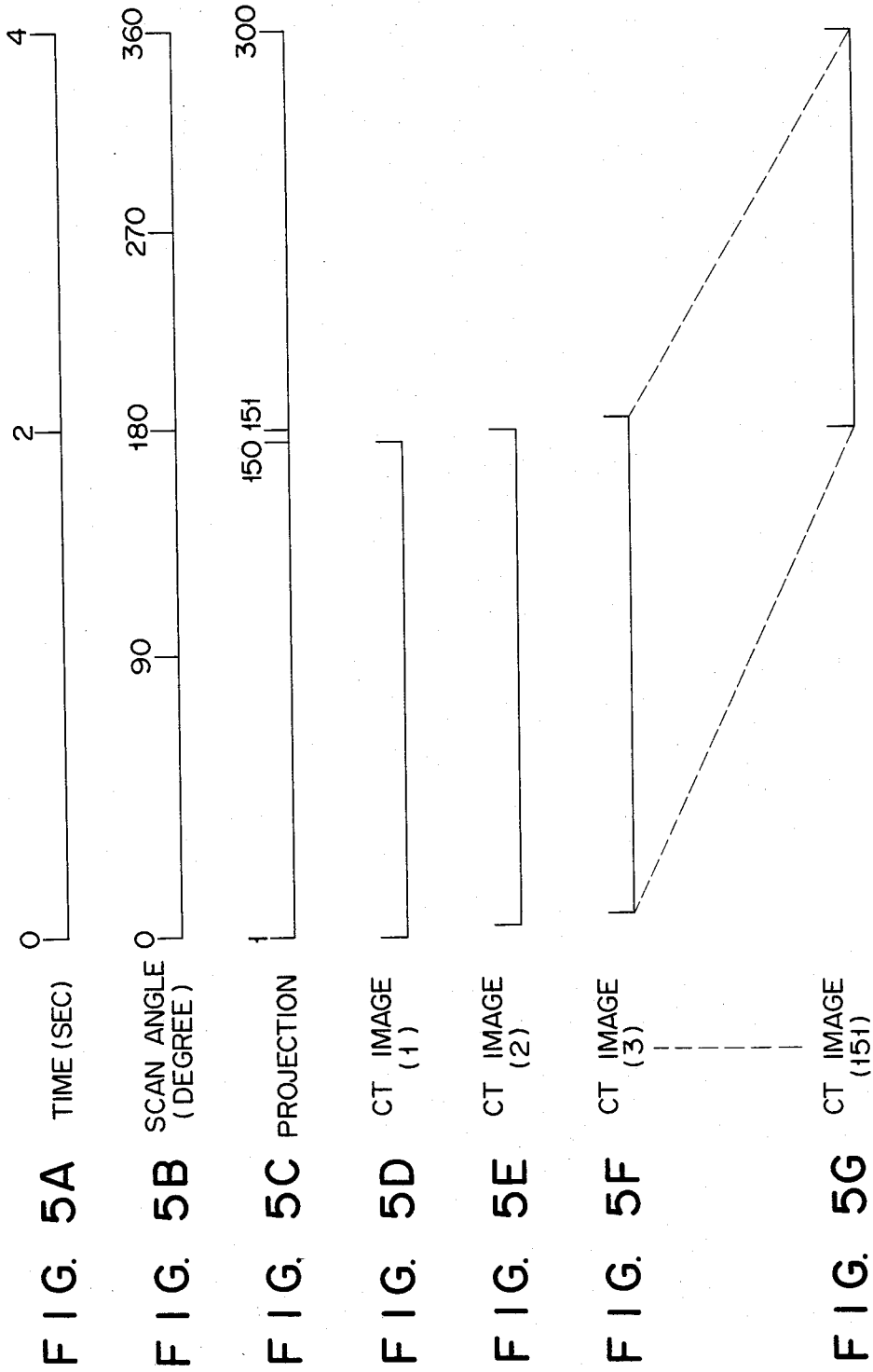

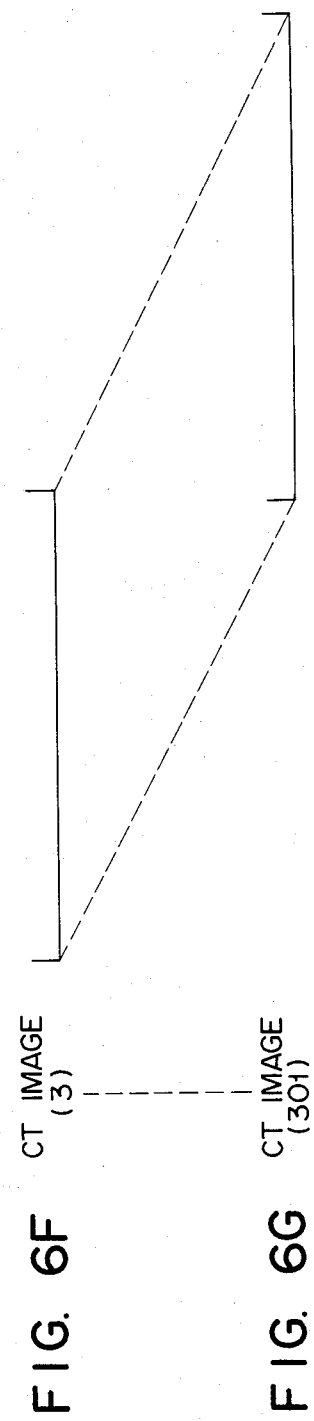
FIG. 6A TIME (SEC)
FIG. 6B SCAN ANGLE (DEGREE)
FIG. 6C PROJECTION
FIG. 6D CT IMAGE (1)
FIG. 6E CT IMAGE (2)
FIG. 6F CT IMAGE (3)
FIG. 6G CT IMAGE (301)

FIG. 7A SCAN TIME (SEC)
FIG. 7B SCAN ANGLE (DEGREE)
FIG. 7C PROJECTION (FAN)
FIG. 7D PROJECTION (PARALLEL)
FIG. 7E CT IMAGE (1)
FIG. 7F CT IMAGE (2)
FIG. 7G CT IMAGE (125)

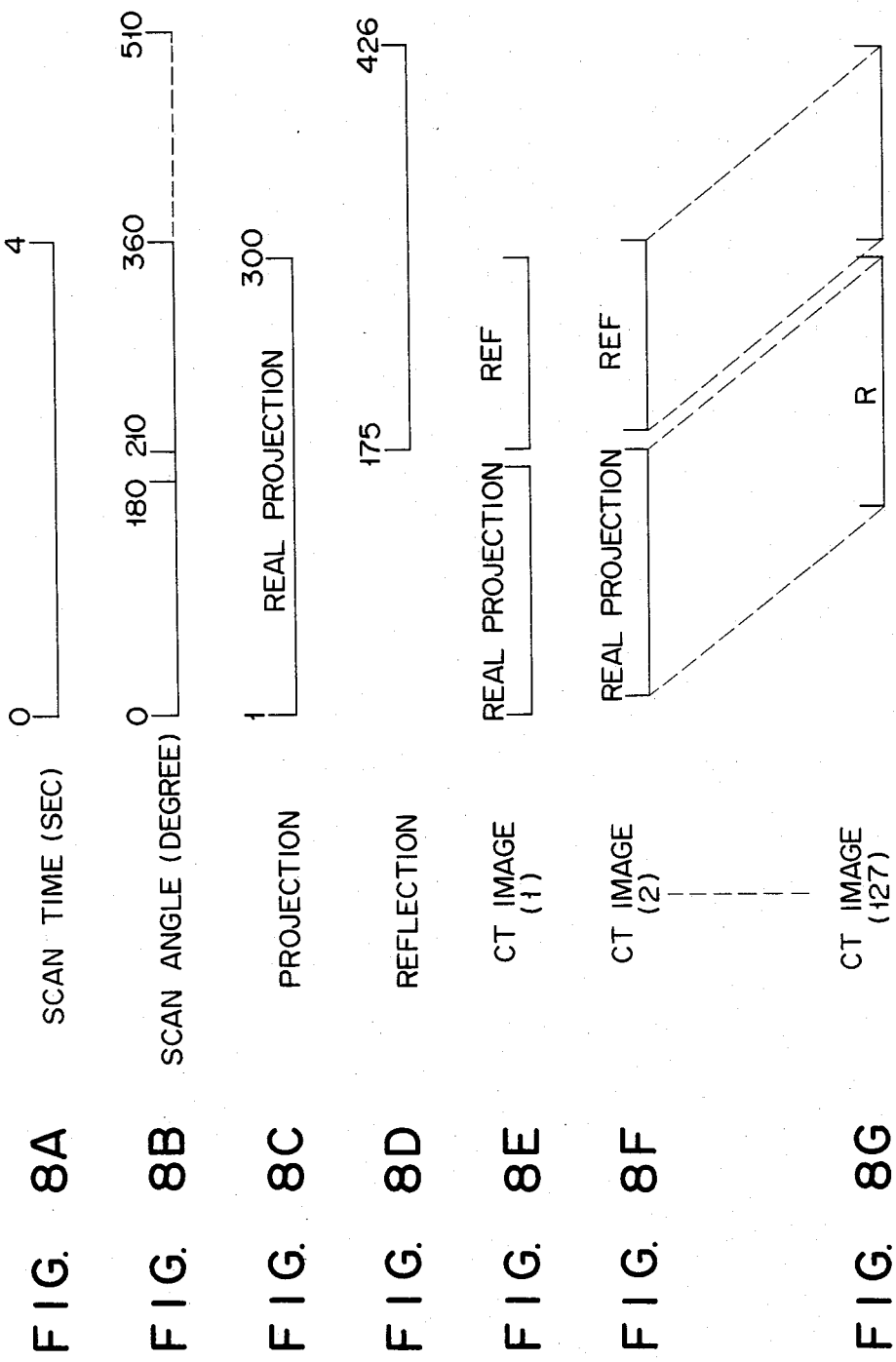

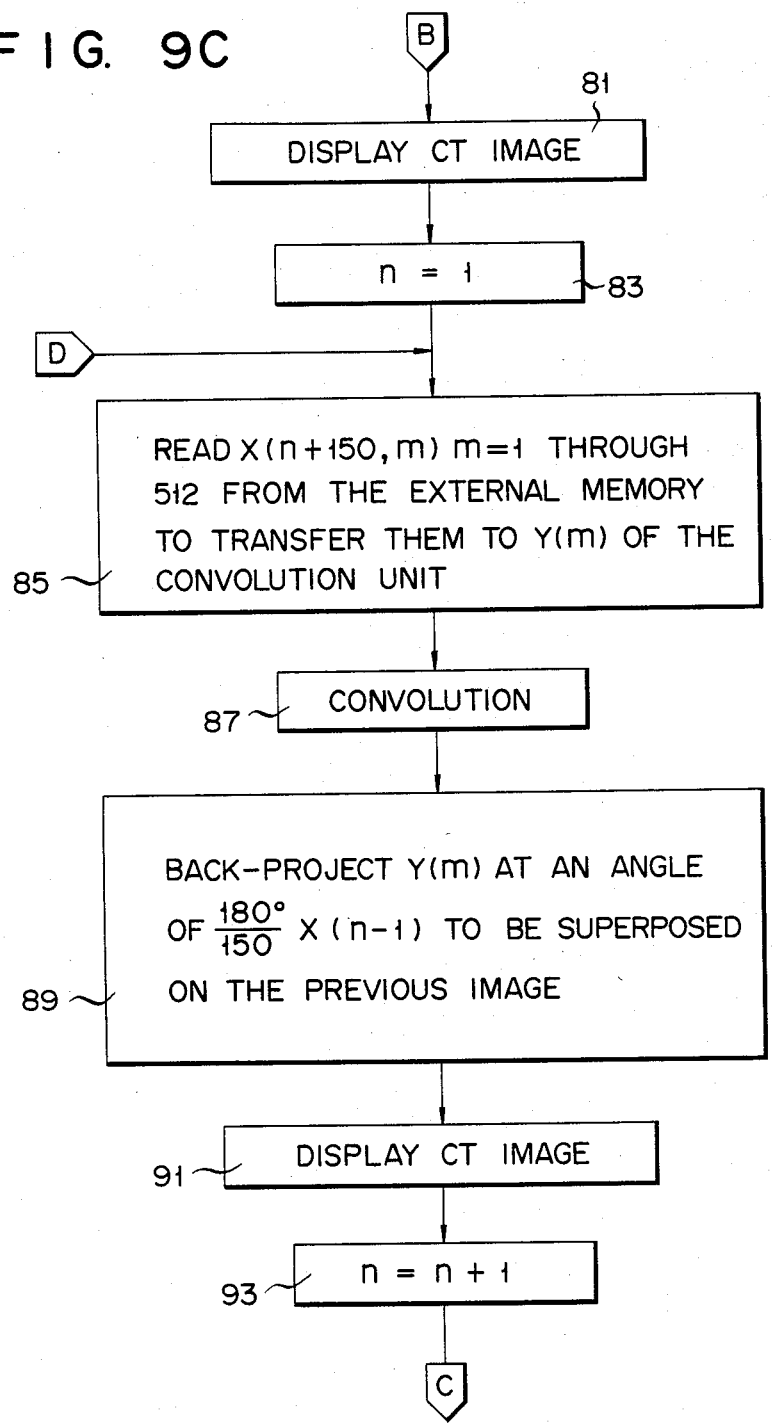

F I G. 9D
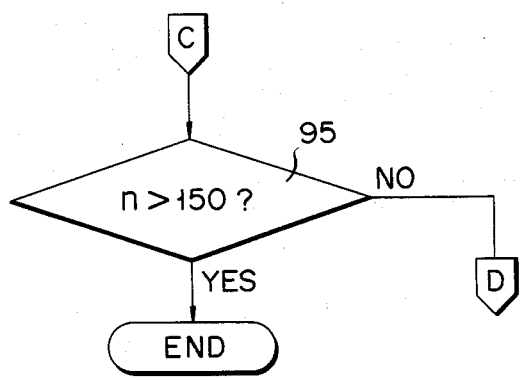
F I G. 10C
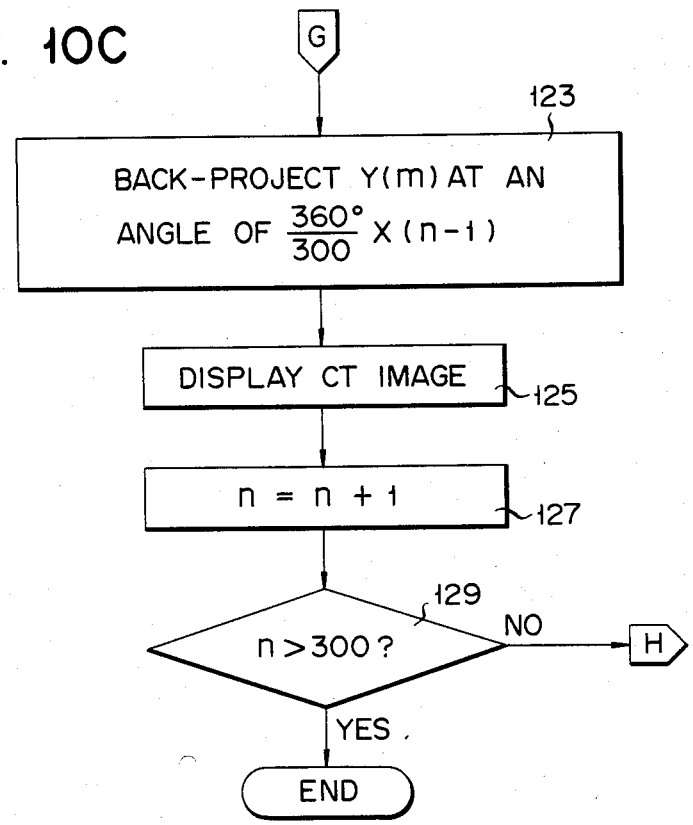

COMPUTED TOMOGRAPHY DEVICE

Background of the Invention

The present invention relates to a computed tomography device (to be referred to as a CT device hereinafter). Dynamic scanning has been attempted with CT devices. Dynamic scanning is a method whereby CT images of the same cross section at different times are formed by continuously scanning the same cross section for a short period of time. With this dynamic scanning, the diffusion of a contrast medium is observed over a certain period of time. In this manner, diagnosis is performed.

A conventional CT device requires a scanning time of at least 4 seconds. Only one CT image is formed every 4 seconds even if scanning is continuously performed. Thus, this CT image includes a time blurring of 4 seconds.

A reconstruction system which performs partial scanning is proposed to form continuous scanning images within a short period of time.

Partial scanning will be described with reference to FIG. 1. In order to simplify its description, a case which defines each projection data as parallel beam data will be described.

FIG. 1 shows rotary scanning whose center is defined as a photographing region R, starting with a first projection P1. Parallel beam data corresponding to 300 projections are acquired upon one rotation of the parallel beams in 4 seconds. In this manner, when the projection data is defined by the parallel beam data, a reconstruction image may be formed when the projection data corresponding to 180° is acquired. Therefore, when the first projection P1 is defined as the initial projection and the 150th projection is defined as the final projection, one CT image is reconstructed. This obtained image includes a time blurring of 2 seconds. Further, when the 51st projection P2 is defined as the initial projection and the 200th projection is defined as the final projection, an additional CT image is reconstructed. This second image also includes the time blurring of 2 seconds in the same manner as the first CT image. However, the second image is reconstructed ⅔ seconds after the first CT image is reconstructed. When the 101st projection P3 and the 151st projection P4 are defined as initial projections, and projections which differ 150 projections from the 101st and 151st projections P3 and P4, respectively, are used, third and fourth CT images ⅔ seconds thereafter are reconstructed. In this example, the respective images differ every 50 projections. However, when the difference is defined as one projection, 151 CT images are formed. These images include the time blurring of 2 seconds. The time blurring between the adjacent CT images is sequentially 2/150 seconds. When these images are continuously displayed, dynamic CT image observation is performed.

However, the following problems are presented when the above method is put into practice:

(1) It takes a long period of time to reconstruct respective CT images of 151 pieces of projection data.

(2) A large memory capacity is required for storing the image data of 151 images.

(3) It is difficult to continuously display the 151 CT images since the amount of data transfer is large.

SUMMARY OF THE INVENTION

It is an object of the present invention to eliminate the above problems and to provide a CT device which reconstructs a dynamic CT image with a small memory capacity and a small amount of data transfer.

In order to achieve the above and other objects of the present invention, there is provided a method for reconstructing an image by a computed tomography device which acquires reconstruction image data corresponding to a plurality of dynamic images by projection data which is time-sequentially acquired by rotary scanning through an angle exceeding an angle corresponding to one reconstruction CT image, comprising the steps of:

(a) obtaining differential data representing the difference between each time-serial projection data strings of a group of projection data strings corresponding to a prospective reconstruction CT image and the respective projection data string corresponding in position therewith;

(b) convolving the differential data; and (c) convolving and back-projecting the group of projection data strings to produce the reconstruction image and further back-projecting the convolved differential data on the reconstruction image.

According to the CT device of the present invention, a number of dynamic CT images are reconstructed in a short period of time. Further, the reconstruction images are simultaneously displayed. Therefore, the amount of data to be transferred at the time of display is minimized.

BRIEF DESCRIPTION OF THE DRAWINGS

Other objects and features of the present invention will be apparent from the following description taken in connection with the accompanying drawings in which:

FIG. 2 is a view for explaining the mode of operation of a CT device according to one embodiment of the present invention;

FIG. 4 is a detailed block diagram of a data acquisition system of FIG. 3;

FIGS. 5A through 5G are timing charts for explaining the relations among time and each projection data used for constructing CT images when one complete rotary scan with the parallel beams is performed, in which FIG. 5A shows time, FIG. 5B shows scan angles, FIG. 5C shows projections, and FIGS. 5D through 5G show CT images (1) to (151), respectively;

FIGS. 6A through 6G are timing charts for explaining the relations among time and each projection data used for constructing CT images when two complete rotary scans with the fan beams are performed, in which FIG. 6A shows time, FIG. 6B shows scan angles, FIG. 6C shows projections, and FIGS. 6D through 6G show the CT images (1) to (151), respectively;

FIGS. 7A to 7G are timing charts for explaining the relations among time and each projection data used for reconstructing CT images when one complete rotary scan with the fan beams is performed and when the reconstruction method being used is the fan beam/parallel beam conversion type, in which FIG. 7A shows time, FIG. 7B shows scan angles, FIG. 7C shows projections, and FIGS. 7D through 7G show the CT images (1) to (151), respectively;

FIGS. 8A through 8G are timing charts for explaining the relations among time and each projection data used for reconstructing CT images when one complete rotary scan with the fan beams is performed and when the reconstruction method is the reflection type, in which FIG. 8A shows time, FIG. 8B shows scan angles, FIG. 8C shows projections and FIGS. 8D through 8G are projection data used for reconstructing CT images (1) to (151);

FIGS. 9A through 9D are flow charts for explaining the mode of operation when one complete rotary scan with the parallel beams is performed according to the present invention;

FIG. 10A through 10C show flow charts for explaining the mode of operation when two complete rotary scans with the parallel beams are performed according to the present invention;

DETAILED DESCRIPTION OF THE PREFERRED EMBODIMENTS

The principle of operation of the CT device according to the present invention will first be described with reference to FIGS. 1 and 2.

Figure 1:
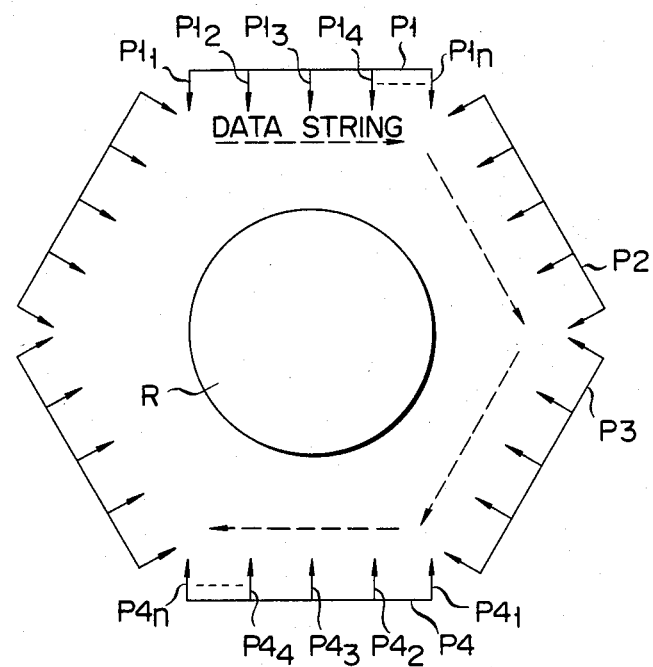
FIG. 1 is a view for explaining the principle of operation of partial scanning with parallel beams.

In FIG. 2, each projection is obtained with parallel beams as in the case of FIG. 1; each projection is represented by the central beam only and three hundred projections are included upon a single rotation of the parallel beams. First projection P1 and 151st projection P151, second projection P2 and 152nd projection, and 150th projection P150 and 300th projection P300, respectively, have an angular difference of 180°. As apparent from FIG. 1, the strings of projection data (P1$_l$ to P1$_n$ and P4$_l$ to P4$_n$) of each pair of projections mentioned above have opposite orders.

According to one embodiment of the present invention, each data string of the 151st projection data P151 through the 300th projection data P300 is first reversed in order by processing the data after it is acquired. Since the angular difference is 180° the X-ray paths through the subject are the same. Therefore, the back projection involves the same angle. Therefore, the data strings of the first through 150th projections and the data strings of the 151st to 300th projections in reverse order may be regarded as data strings of the same angle and the same order.

In the next step, the difference between each pair of projection data strings having an angular difference of 180° is obtained. The resultant data will be referred to as delta projection data strings. Thus, the difference between the 151st projection data string P151 (of reversed order) and the first projection data string P1 will be referred to as the first delta projection data string. Similarly, the second through 150th delta projection data strings are obtained.

Next, data strings from the first projection P1 through the 150th projection P150 are convolved and backprojected to reconstruct a first CT image (1).

A second CT image (2) will then be considered. The second CT image may be obtained by back projection of the data string of the second projection P2 through the 151st projection P151. When the data strings for reconstruction of the first and second CT images are compared, it is found that they are the same except that the data string of the first projection P1 and the data string of the 151st projection P151 are different. It follows from this that the second CT image can be obtained by back projection of the negative data string of the first projection P1 and the data string of the 151st projection P151 on the first CT image. The first projection P1 and the 151st projection P151 have an angular difference of 180°. Therefore, if the data string corresponding to the 151st projection P151 is reversed as has been described above, back projection may be performed at the same angle as that of the first projection P1. In this manner, the second CT image can be obtained by back-projecting the difference between the reverse order data string of the 151st projection P151 and the data string of the first projection P1 on the image data of the first CT image. This is equivalent to the back projection of the first delta projection data string on the image data of the first CT image.

According to this embodiment of the present invention, the second CT image is obtained by back projection of the first delta projection data string on the image data of the first CT image. In a similar manner, an nth CT image is obtained by back projection of an (n−1)th delta projection data string on an (n−1)th CT image.

According to this process, CT images (each including the time blurring of 2 seconds) with 2/150 second time lag between adjacent images are continuously obtained by back projection of a single projection data string. A group of delta projection data strings may be back-projected within a relatively short period of time (e.g. 1 second). Therefore, if an image memory for back projection also serves as a display memory, dynamic CT images may be continuously displayed.

Figure 3:
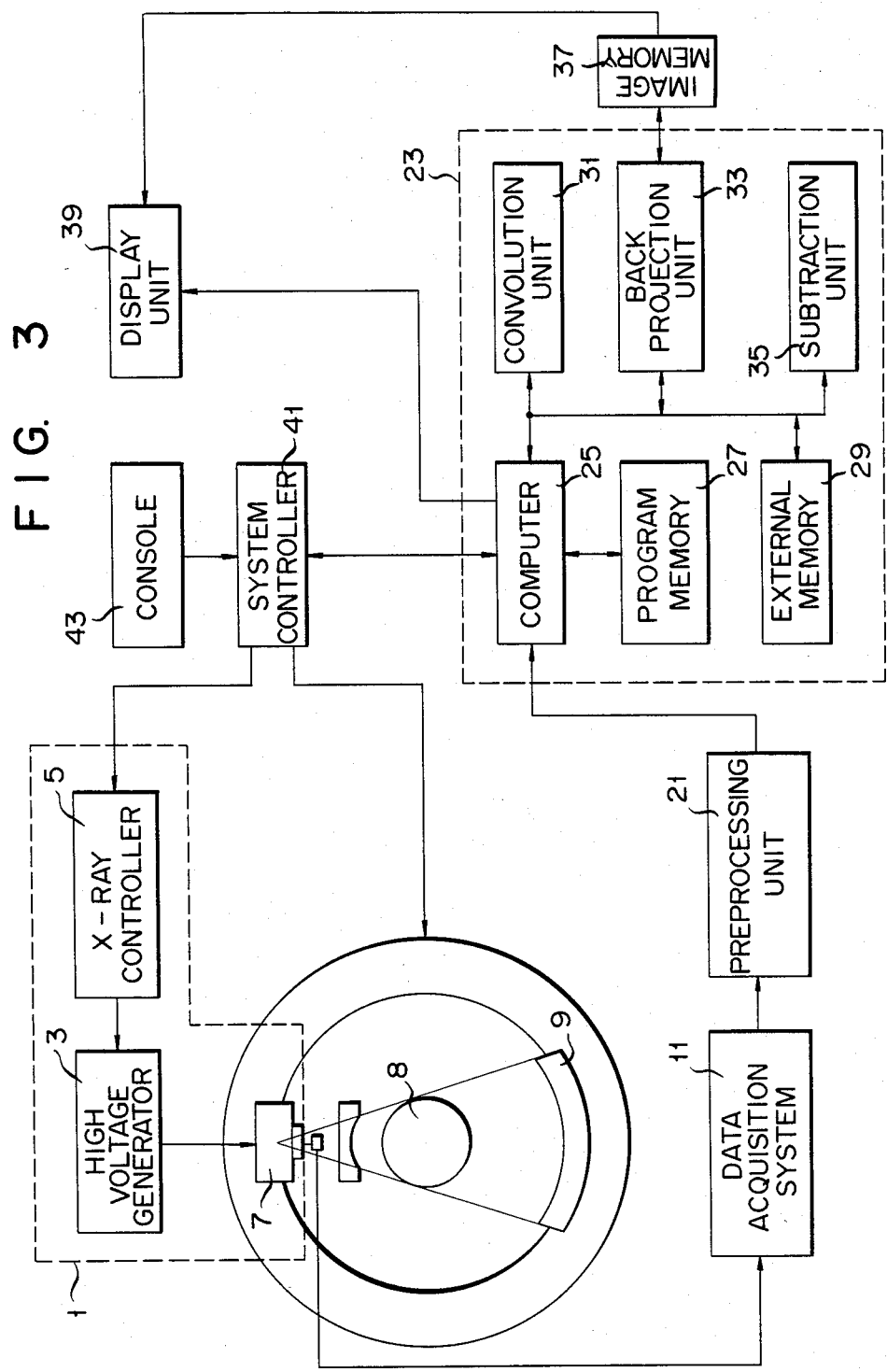
FIG. 3 is a block diagram showing the mode of operation according to the embodiment of the present invention as shown in FIG. 2.
Figure 9A:
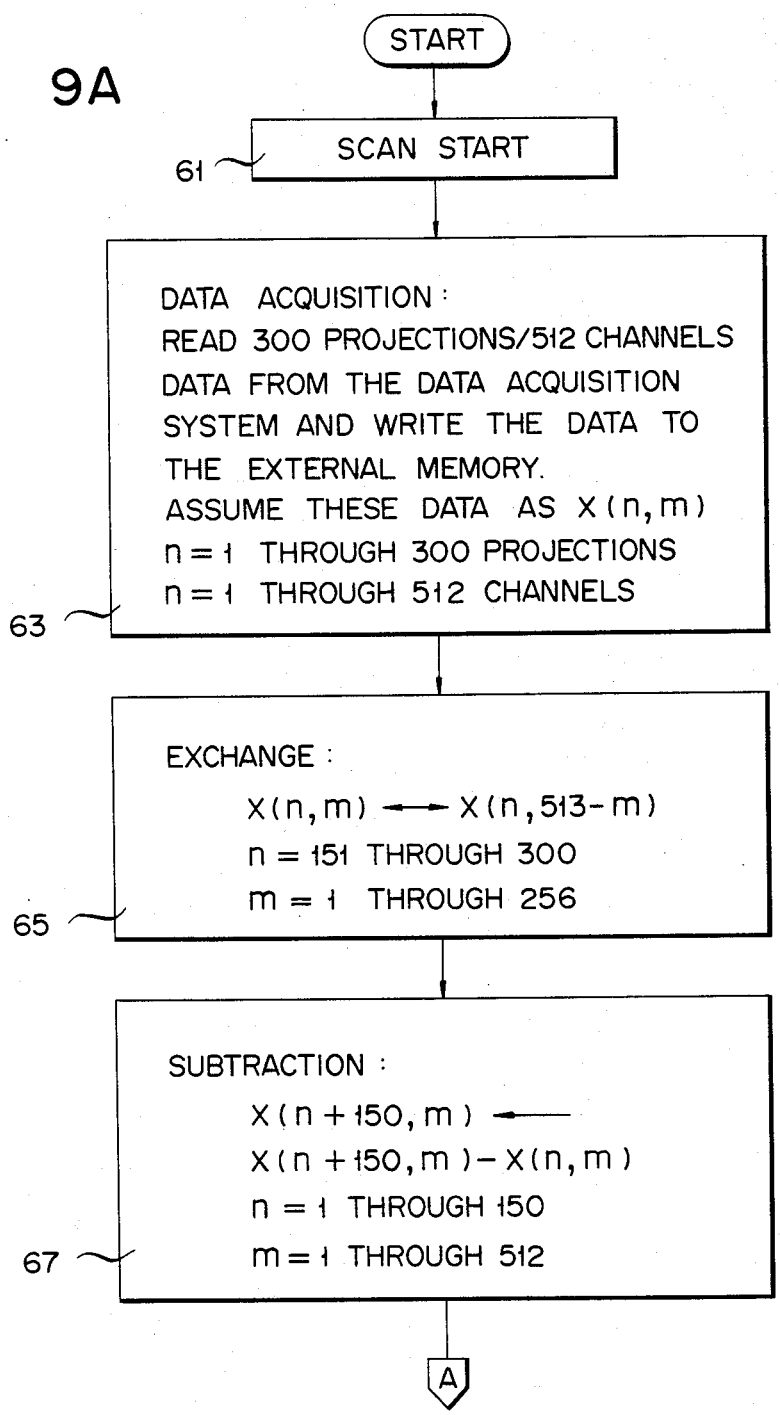
Figure 9B:
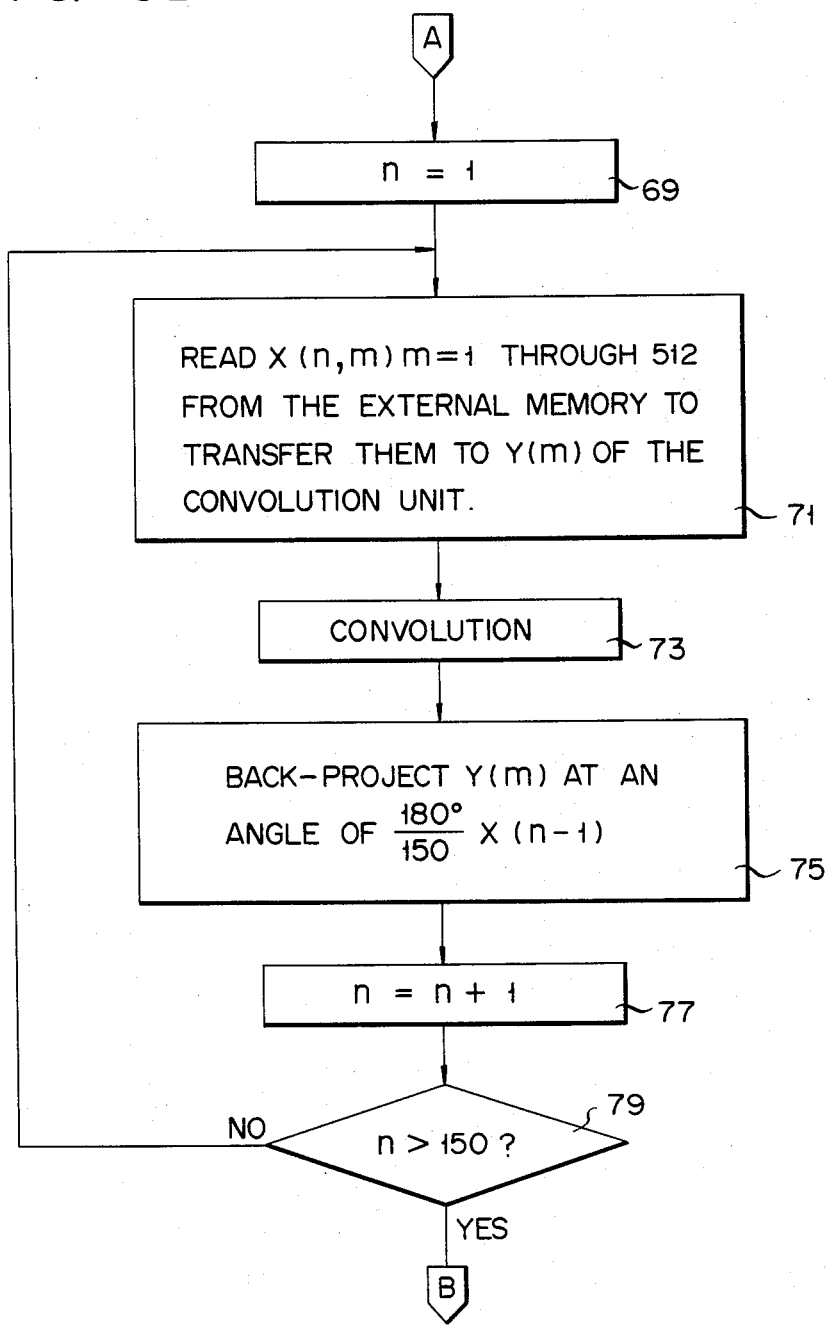

FIG. 3 is a block diagram showing the embodiment of the present invention according to the principle described with reference to FIG. 2 above. In this embodiment, a third generation Rotate/Rotate type (hereinafter referred to as R - R type) is applied. An X-ray generator 1 comprises a high-voltage generator 3, an X-ray controller 5 and an X-ray tube 7 for producing X-rays. In response to a signal supplied from a system controller 41, the X-ray tube 7 and an X-ray detector 9 supported on a supporting base to be described later start operating. The X-ray tube 7 and the X-ray detector 9 rotate as a unit through an angle of 360° or 720° around the subject. During the rotation, the subject is exposed to the X-rays in response to an X-ray exposure signal. The X-rays which expose the subject 8 are detected by the X-ray detector 9. The X-ray detector 9 has, for example, 512 channels, and the output signal from the X-ray detector 9 is supplied to a data acquisition system 11. The data acquisition system 11, as shown in FIG. 4, comprises an amplifier 13, a sample/hold circuit 15, a multiplexer 17, and an A/D converter 19. The signal output from the X-ray detector 9 is amplified to a suitable level by the amplifier 13, and a pulse signal is converted into a dc signal by the sample/hold circuit 15. The output signal from the sample/hold circuit 15 is supplied to the A/D converter 19 through the multiplexer 17 to be converted into a digital signal. The output signal from the data acquisition system 11 is supplied to a preprocessing unit 21. The details of the preprocessing unit are described in "CT Scanner", Yoshinori IWAI, CORONA publishing CO., LTD. JAPAN, 1979.

The preprocessing unit 21 converts the output signal from the data acquisition system 11 into an integrated value of a beam absorption coefficient.

In addition to this conversion, the preprocessing unit 21 performs the characteristic fluctuation correction, the X-ray reference correction and so on of the X-ray detection system. The output signal from the preprocessing unit 21 is supplied to a computer system 23. The computer system 23 comprises a computer 25, a program memory 27 for storing a control program, an external memory 29 for storing the output data from the preprocessing unit 21, a convolution unit 31 for performing a convolution calculation of the projection data, and a subtraction unit 35 which obtains the difference between two pieces of convolved projection data which are back-projected by a back projection unit 33. The computer 25 is connected to an image memory 37 for storing reconstruction image data and to a display unit 39 for displaying the reconstruction image data output from the image memory 37, as well as being connected to the X-ray generator 1 and a system controller 41. Further, the back projection unit 33 is connected to the image memory 37.

The device of the present invention will now be described with reference to a case wherein one complete rotary scan with the parallel beam is performed. The parallel X-ray beams produced by the X-ray tube 7 are transmitted through the subject 8 and are detected by the X-ray detector 9. The output signal from the X-ray detector 9 is supplied to the data acquisition system 11 wherein it is A/D converted into digital signals which are then supplied to the external memory 29.

The X-ray tube 7 and the X-ray detector 9 continuously rotated as a unit about the subject. Then, the first 512 channel data string is obtained after a predetermined angle of rotation. After the first 512 channel data string is obtained, the tube 7 and the detector 9 rotates through another predetermined angle, and the next 512 channel data string is obtained.

The above operation is repeated three hundred times over 360°.

In this embodiment, during the scan, three hundred, 512 channel data strings are stored in the external memory.

When the data acquisition is completed, the strings of data from the 151st projection P151 through the 300th projection P300 are reversed in order.

The delta projection data string described with reference to FIG. 2 is obtained by the subtraction unit 35. First, the difference between each channel of the data string of the 151st projection P151 and the corresponding channel of the first projection P1 data string is calculated for each channel, and the resultant first delta projection data string is stored at the location in the external memory corresponding to the 151st projection. In a similar manner, the data string of the 152nd projection P152 and the data string of the second projection P2, the data string of the 153rd projection P153 and the data string of the third projection P3, and the data string of the 300th projection P300 and the data string of the 150th projection P150 are processed.

In the next step, the data strings of the first projection P1 through 150th projection P150 are convolved by the convolution unit 31 by a method well known to those skilled in the art. The projection data strings which are convolved in this manner are back-projected by the back projection unit 33 also by a method well known to those skilled in the art and are then stored in the image memory 37 as a first computed tomography image (1) (to be referred to as a CT image hereinafter for brevity). The details of the convolution method and the back projection process are described in the above "CT Scanner". The display unit 39 displays the CT image which is read out from the image memory 37. Then, the first delta projection data string is subjected to convolution by the convolution unit 31. The convolved first delta projection data string is back-projected by the back projection unit 33 and is stored in the image memory 37. A second CT image (2) is then displayed on the display unit 39. The second CT image has a time lag of 2/150 second with respect to the first CT image. In a similar manner, another CT image after another 2/150 second can be reconstructed and so on. FIGS. 5A through 5G show the relations among the CT images, respective projection data strings and time according to this embodiment.

In the embodiment described above, the description has been made with reference to a case wherein parallel beams are used as the projection beam at each scan angle. However, the present invention is similarly applicable to the case wherein fan beams are used.

In the description to follow, a case will be described wherein scanning is continuously performed through two complete rotations, that is, wherein two rotary scanning operations through 720° are performed for acquiring projection data. In this case, two different strings of data are obtained at the same scan angle. In this embodiment, the difference between the first projection data string at a certain scan angle of the first rotation and the second projection data string at the same scan angle of the second rotation will be referred to as the delta projection data string. The first CT image is obtained by back projection of the projection data string which is, in turn, obtained upon first rotation through 360°. Thereafter, CT images are continuously obtained by sequential back projection of the delta projection data strings.

A description will now be made with reference to FIG. 3 hereinafter. The X-ray fan beams produced by the X-ray tube 7 are transmitted through the subject 8 and are detected by the X-ray detector 9. In this embodiment, the X-ray detector 9 has 512 channels. The output signal from the X-ray detector 9 is A/D converted in the data acquisition system 11 into 512 digital signals which are transferred to the preprocessing unit 21. The 512 digital signals are subjected to physical correction, logarithmic correction and so on by the preprocessing unit 21, and the resultant signals are stored in the external memory 29. The X-ray tube 7 and the X-ray detector 9 together rotate about the subject 8 through 720°. In this embodiment, data from 512 channels is acquired 500 times and is stored in the external memory during rotation through 720°. The series of operations up to this point are the same as those in the third generation CT technique. Thereafter, when data acquisition is completed, delta projection data strings are generated by the subtraction unit 35. First, the difference between the data string of the 301st projection P301 and the data string of the first projection P1 is calculated, and the resultant first delta projection data string is stored in the location of the external memory 29 corresponding to the 301st projection. Thereafter, the data string of the 302nd projection P302 and the data string of the second projection P2, the data string of the 303rd projection P303 and the third projection P3 and so on, and finally the data string of the 600th projection P600 and the data string of the 300th projection P300 are processed. Then, the first to 300th projection data strings are subjected to convolution by the convolution unit 31. The convoluted projection data strings are then back-projected by the back projection unit 33 and are stored in the image memory 37 as a CT image. The convolution and back projection are performed in the conventional manner. The CT image thus obtained is displayed on the display unit 39. Then, the first delta projection data string is subjected to convolution by the convolution unit 31 to provide the CT image which is delayed by 2/150 second with respect to the CT image described above. FIGS. 6A through 6G shows the relations among the CT images, projection data strings and time in this embodiment.

Similar operations may be performed in the case wherein only one complete rotary scan with the fan beams is performed. In this case, the CT image is obtained based upon the data string corresponding to the angle of 180° plus the fan angle. This may be performed by the method for producing the parallel beams from the fan beams by approximation or by the method for generating reflection projection data corresponding to the remaining angle of [360°-(180°+fan angle)].

The conversion of the fan beams into parallel beams will first be described. A method for converting the fan beams into parallel beams is described, for example, in D. Boyd, J. Coonrod, J. Dehnert, D. Chu, C. Lim, B. MacDonald, and V. Perey. Mencley, "High pressure Xenon Proportional Chamber for X-ray Laminographic Reconstruction Using Fan Beam Geometry", IEEE Transactions on Nuclear Science, Vol. NS-21, No. 1, February, 1974. According to this method, parallel beams of 15° through 195° can be produced by approximation from fan beams of 0° through 210°. Parallel beams of 165° through 345° can be produced by approximation from fan beams of 150° through 360°. As a whole, parallel beams of 15° to 345° can be obtained from fan beams of 0° through 360°. When the parallel beams are obtained in this manner, the present invention can be practiced by a method similar to that as described above. First, the data string corresponding to a beam from 215° through 345° are reversed. The difference between the data string corresponding to the angle of 215° to 345° and the data string corresponding to the angle of 15° to 215° is calculated to generate the delta projection data string. When the CT image is reconstructed from the data string corresponding to the angle of 15° to 215° and the delta projection data string is sequentially convolved and back-projected, observation of the dynamic CT image over time can be performed. FIGS. 7A through 7G show the relations among the CT images, projection data strings and time when the fan beams are converted into the parallel beams.

A description will secondly be made on the case of the reflection technique wherein the projection data string corresponding to the angle of [360°-(180°+(fan angle)]is obtained as a reflection data string from the data string corresponding to the angle of 180° plus fan angle, and the fan data string is reconstructed through a total scan angle of 360°. The reflection data string is obtained by the method which samples the beams which oppose each other by 180° from a plurality of projections. The reflection technique itself is a known art and is, for example, described in U.S. Pat. No. 4,280,178 and 4,284,896. According to this technique, as shown in FIG. 8E, CT images are reconstructed from the real data strings of the first projection through the 174th projection and the reflection data strings of the 175th projection through the 300th projection. The second CT image (2) is reconstructed from the real projection data strings of the second projection through the 175th projection and the reflection projection data strings of the 176th projection through the 301st projection. The CT images (1) and (2) obtained in this method are reconstructed based on two different pieces of data corresponding to two opposing angles. In other words, the second CT image (2)=the first CT image (1)+[REF301−real PRJ 1] angle 0+[real PRJ 175−REF175] angle 210. Therefore, this reflection system requires two different pieces of delta projection data: A delta projection data string and B delta projection data string. The A delta projection data strings are obtained by subtractions of REF301−PRJ1, and so on up to REF426−real PRJ126. On the other hand, the B delta projection data strings are obtained by subtractions of PRJ175−REF175, and so on up to PRJ300−REF300.

The first CT image is first reconstructed based upon the PRJ1 through PRJ174 and REF175 through REF300. Thereafter, the CT images with 2/150 second time lag are sequentially obtained by back projection of the A and B delta projection data strings. This is shown in FIGS. 8A through 8G.

In the above embodiments, the second and third-generation system has been described. However, the fourth generation Rotate/Stationary system (hereinafter referred to as R - S system can also be applied.

FIGS. 9A through 9D show the flow chart of the control program stored in the program memory 27 corresponding to the parallel beams. In step 61, the scanning operation is started. In step 63 to follow, the data acquisition is performed. Thus, the data corresponding to 300 projections (each 512 channel projection data string) is read out from the data acquisition system 11. The readout data is stored in the external memory 29 in the form of a two-dimensional data array, X (n, m) (where n=1 through 300 and m=1 through 512). In step 65, the data string for each of the 151st projection through the 300th projection is reversed in order. As a consequence, the projection data strings from the first projection through the 150th projection and the projection data strings from the 151st projection through the 300th projection which are reversed order may be regarded as data of the same angle and the same order.

In the next step 67, the difference between a pair of projection data strings with 180° angular difference, that is, the delta projection data string as described above is obtained. In step 69, n is set to 1. In step 71, the first 512 channel projection data string is read out from the external memory 29, and the readout data is supplied to Ym of the convolution unit 31. As a result, the convolution unit 31 performs a convolution and stores the obtained result in Ym in step 73. In step 75, data at Ym is back-projected at an angle of 180°/150°×(n−1). In step 77, the number of projections is incremented by 1. In step 79, it is determined if the number of projections has reached 150. If the number of projections is determined to be less than 150 in step 79, the program returns to step 71 and steps 71 to 79 are repeated until the data corresponding to 150 projections is back-projected. If the number of projections is determined to be 151 or more in step 79, the program advances to step 81 and a CT image is displayed. The program then advances to step 83 and n is set to 1 again. In step 85, the delta projection data string array, X (n+150, m) (where m=1 through 512) is read out from the external memory 29 and is transferred to Ym of the convolution unit 31. Then, the convolution unit 31 performs a convolution and stores the obtained result in Ym in step 87. In step 89, data at Ym is superposed on the previous image at an angle of 180/150×(n−1) for back projection. In step 91, the CT image is displayed. In step 93, the number of projections is incremented by 1. In step 95, it is determined if the number of delta projection data strings has reached 150. If the number of delta projection data strings are less than 150, the program returns to step 85, and steps 85 through 95 are repeated until the data corresponding to 150 delta projection data strings are back-projected.

Figure 10A:
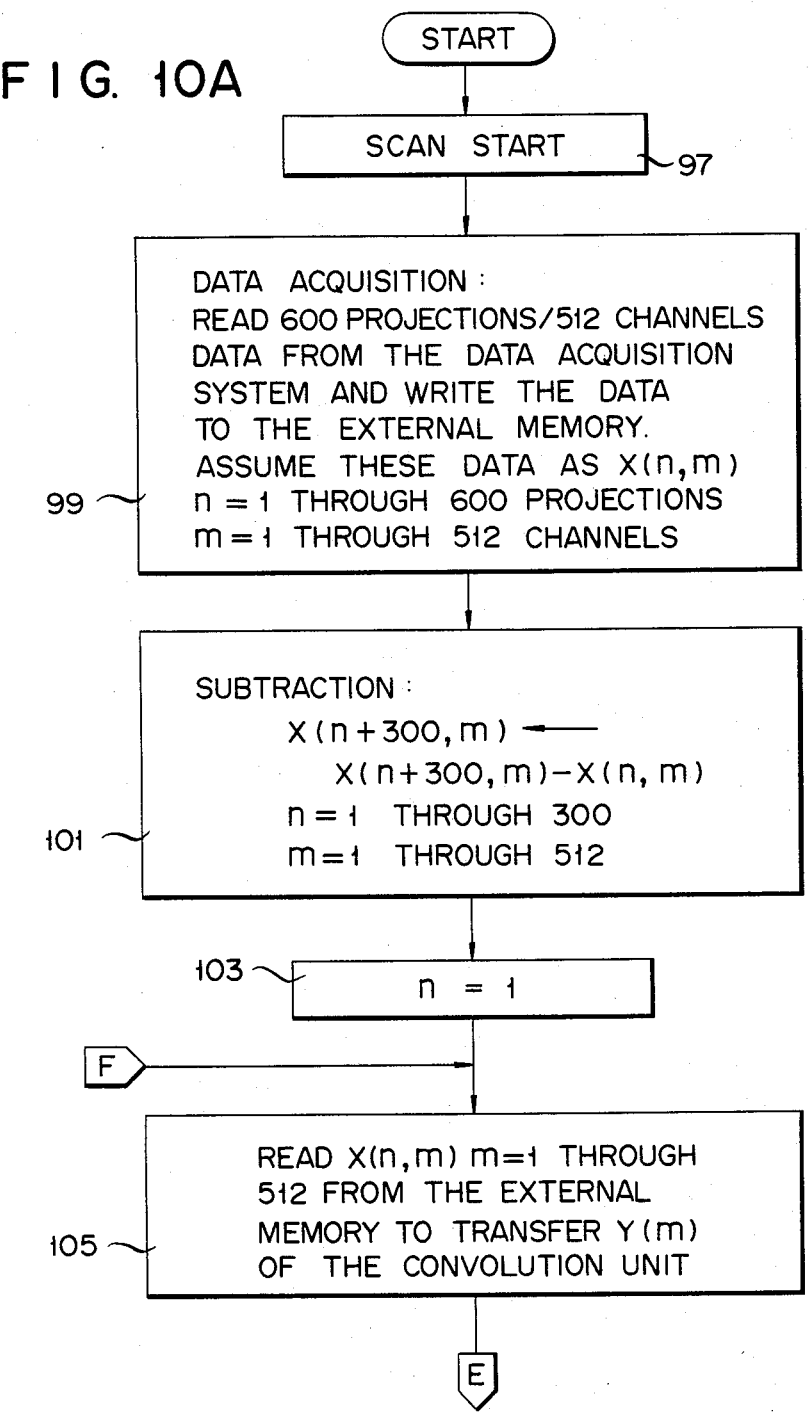
Figure 10B:
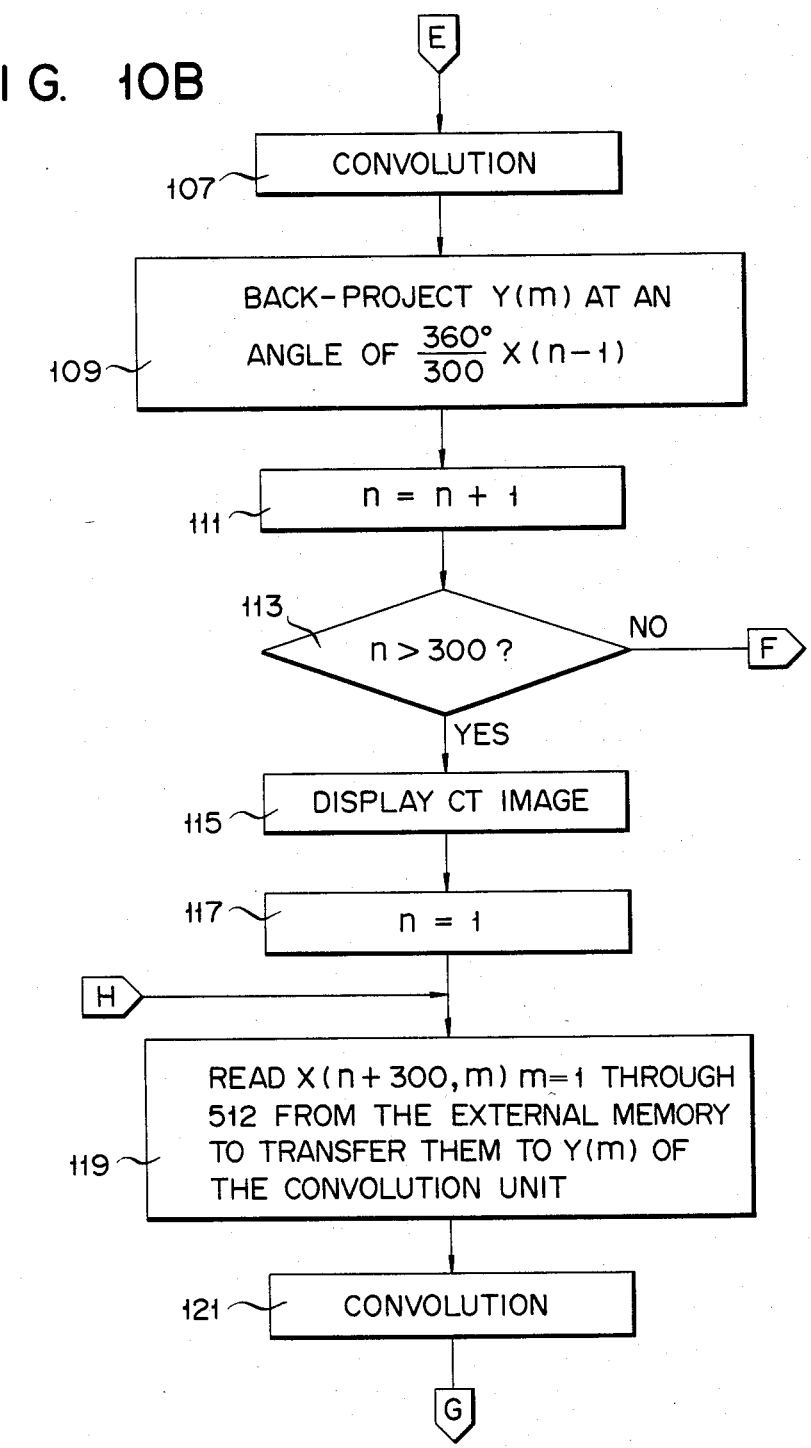
Figure 11A:
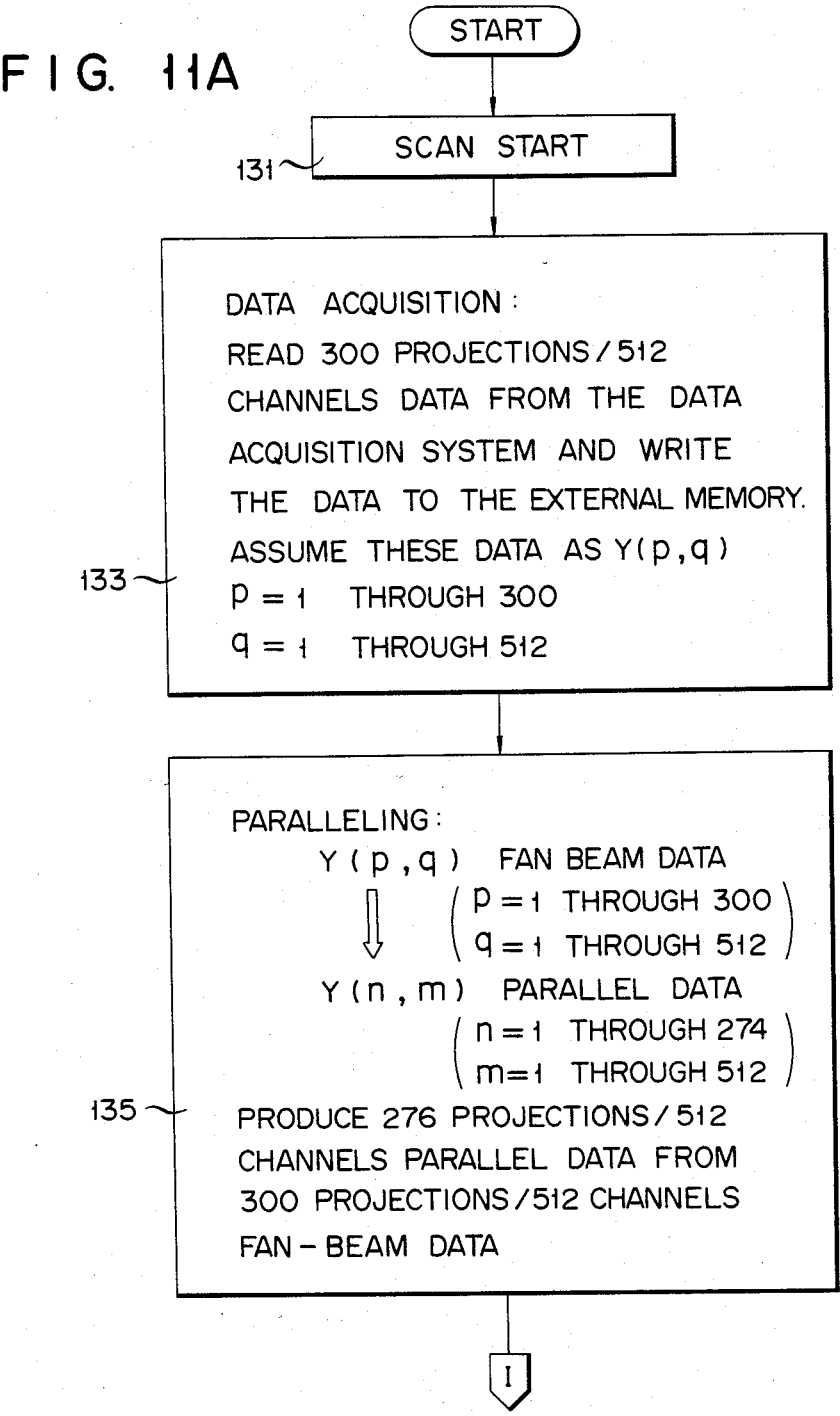
FIGS. 11A through 11D are flow charts for explaining the mode of operation when one complete rotary scan with the fan beams is performed and when the reconstruction method is the fan beam/parallel beam conversion type according to the present invention.
Figure 11B:
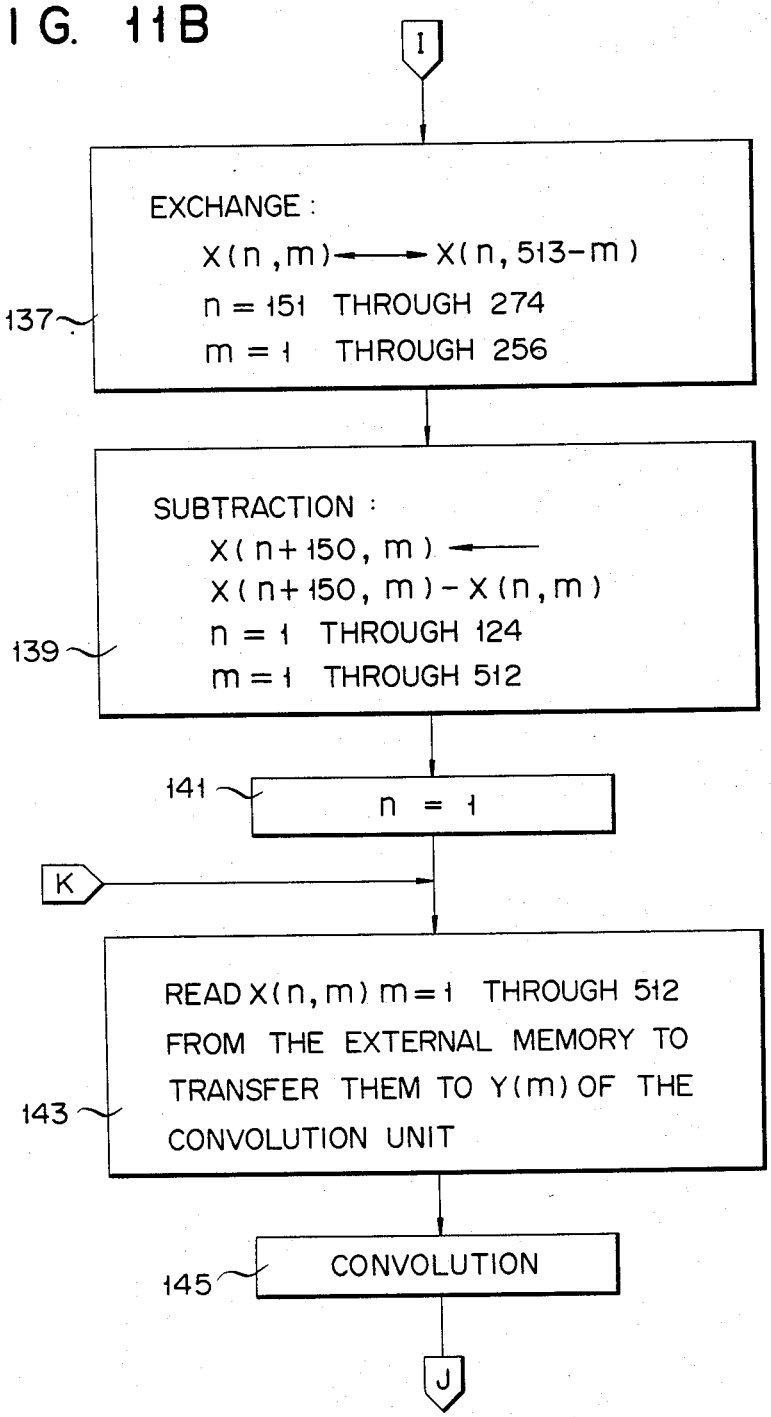
Figure 11C:
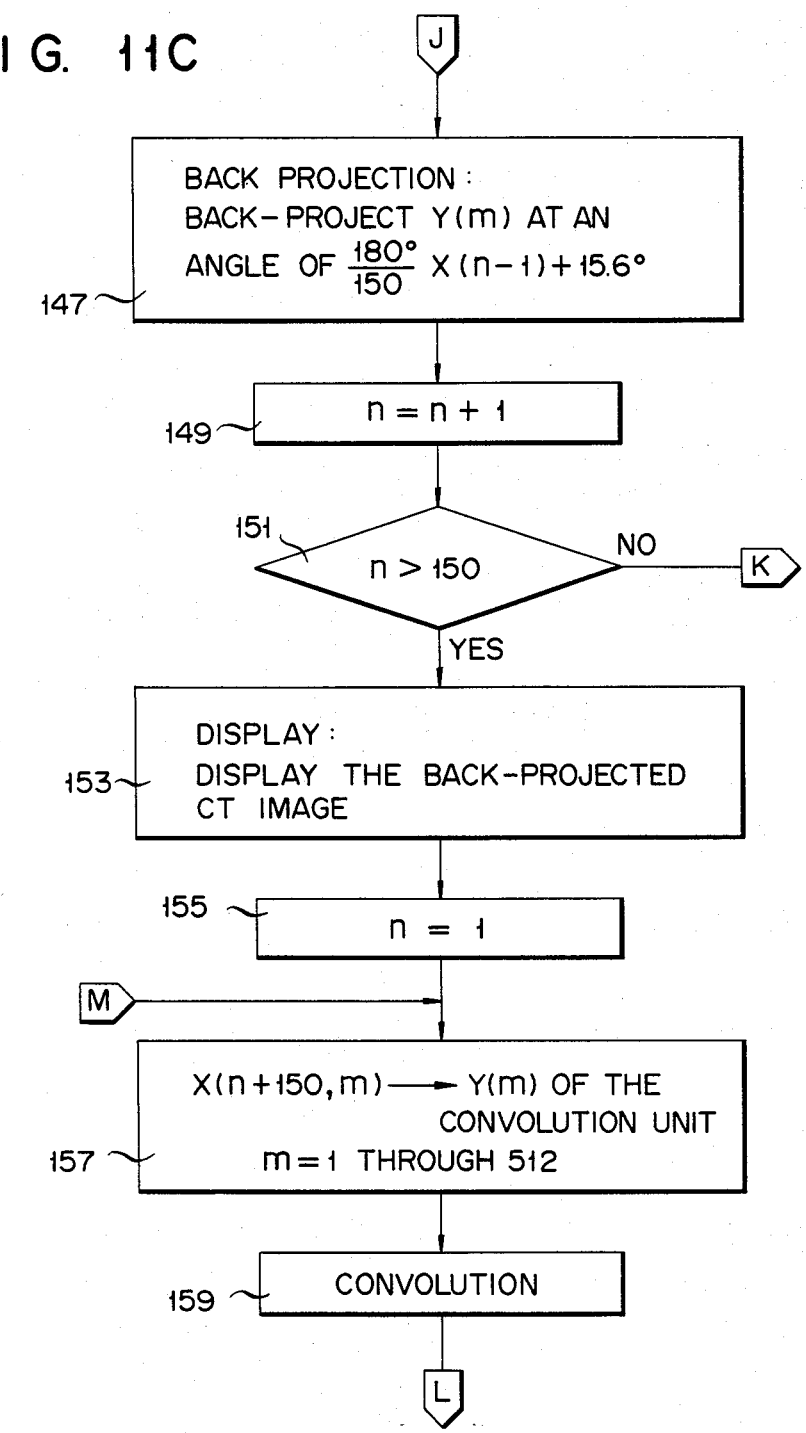
Figure 11D:
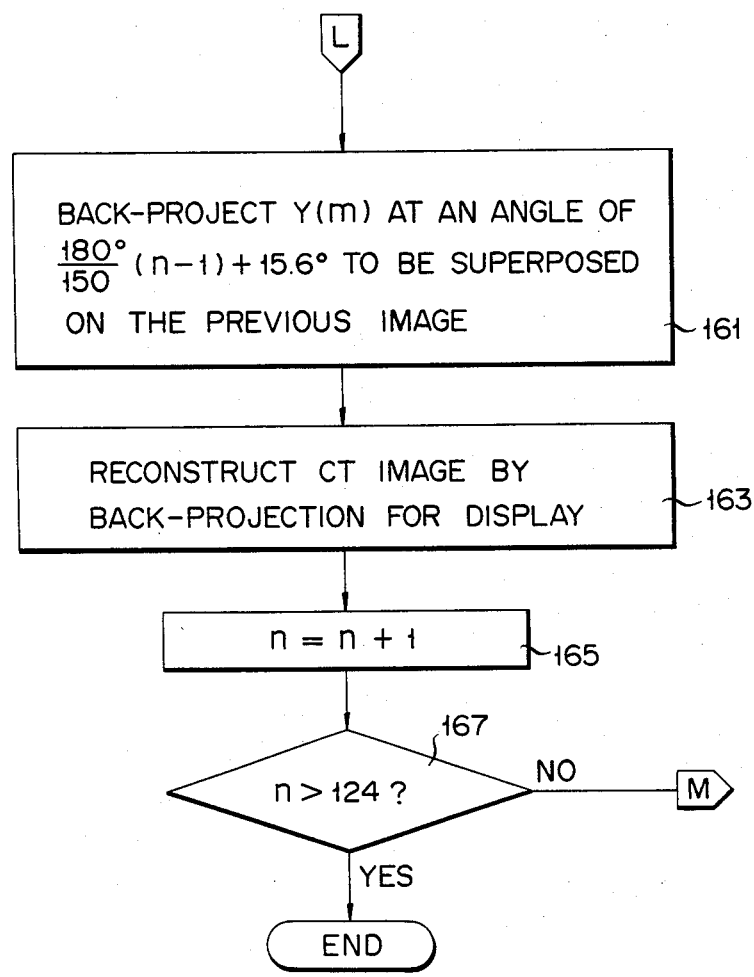
Figure 12A:
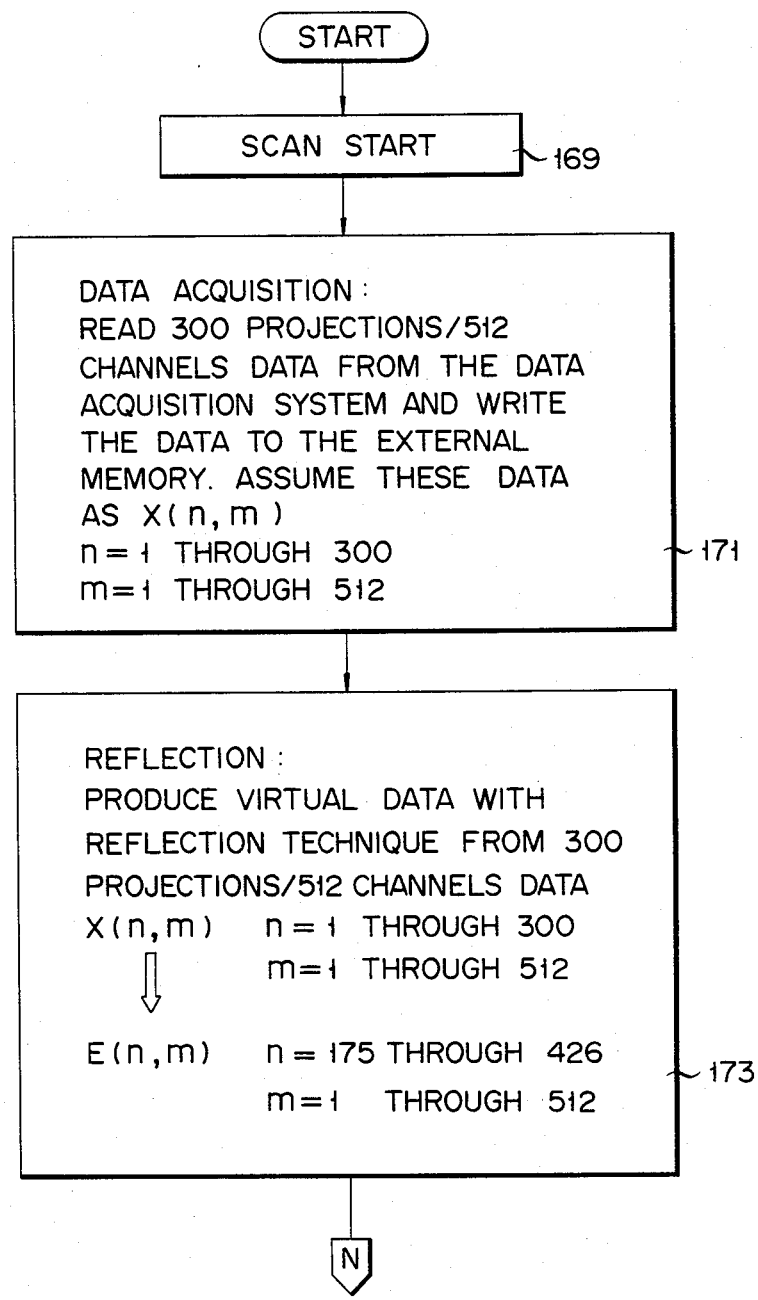
FIGS. 12A through 12E are flow charts for explaining the mode of operation when one complete rotary scan with the fan beams is performed and when the reconstruction method is the reflection type according to the present invention.
Figure 12B:
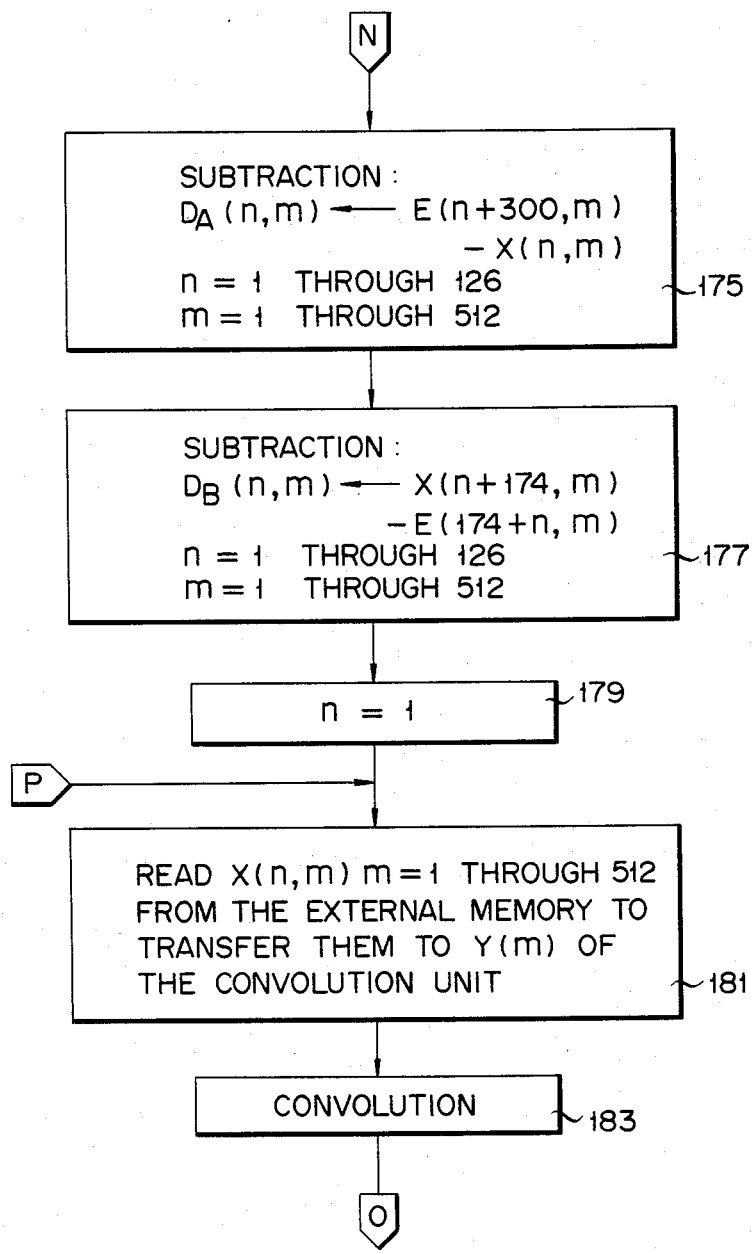
Figure 12C:
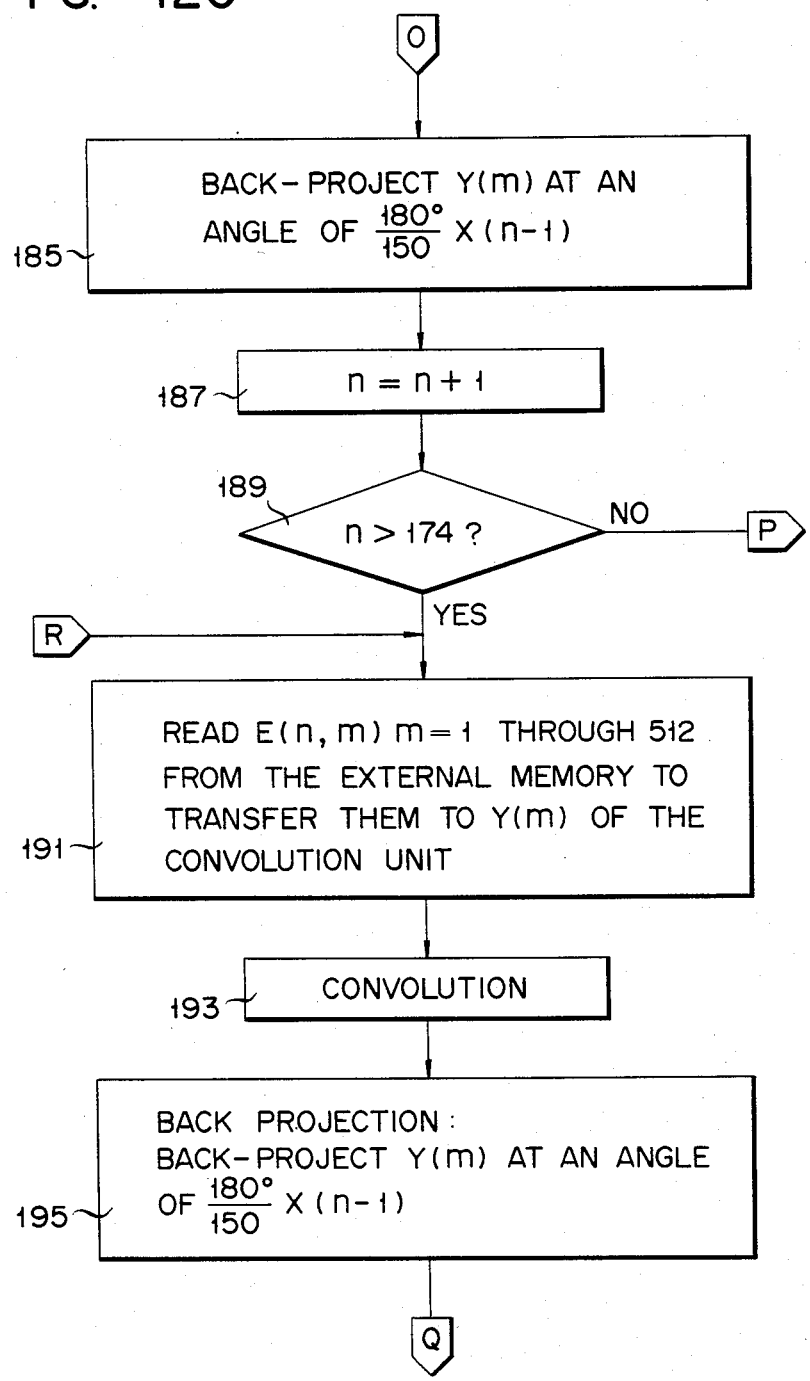
Figure 12D:
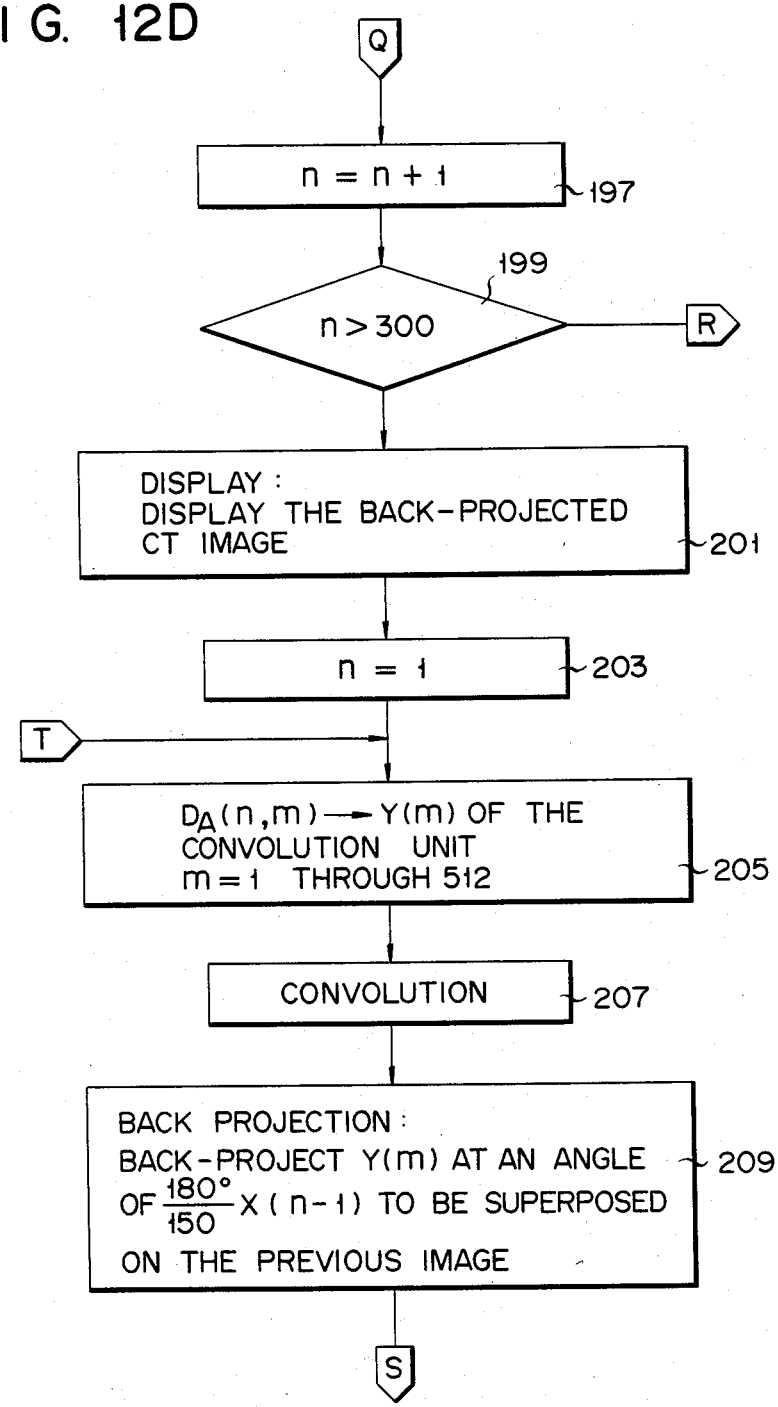
Figure 12E:
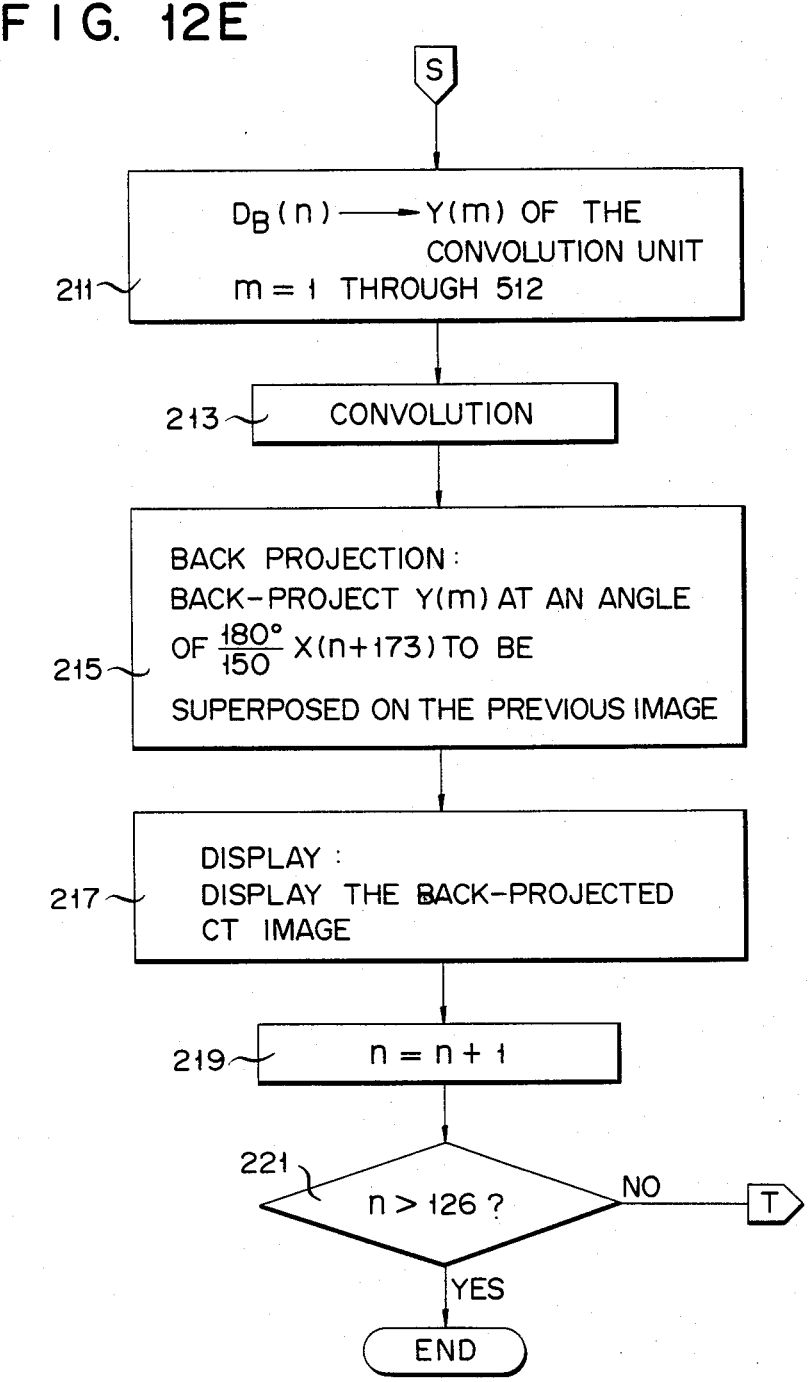

FIGS. 10A through 10C show the processing flow chart when two full rotary scans with the fan beams are performed. In step 97, scanning is started. In step 99 to follow, the data acquisition is performed. Thus, the data of 600 projections (each projection corresponding to 512 channels) is read out from the data acquisition system 11. The readout data is written in the external memory 29 in the form of a two-dimensional data array X (n, m) (where n=1 through 600 and m=1 through 512). In step 101, the delta projection data string is generated by the subtraction unit 35. The difference between each channel of the data string of the 301st projection and the corresponding channel data string of the first projection is calculated, and the resultant first delta projection data string is written in the location of the external memory 29 corresponding to the 301st projection. In a similar manner, the data string of the 302nd projection and the data string of the second projection, the data string of the 303rd projection and the data string of the third projection, and so on up to the data string of the 600th projection and the data string of the 300th projection are processed. Next in step 103, n is set to 1. In step 105, the data string for the first projection of 512 channels is read out from the external memory 29, and is supplied to Ym of the convolution unit 31. The convolution unit 31 performs a convolution and stores the obtained result in Ym in step 107. In step 109, data at Ym is back-projected at an angle of 360°/300°×(n−1). In step 111, the number of projections is incremented by 1. In step 113, it is determined if the number of projections has reached 300. If the number of projections is determined to be less than 300, the program returns to step 105, and steps 105 to 113 are repeated until the data corresponding to 300 projections is back-projected. If the number of projections is determined to be 301 or more in step 113, the program advances to step 115 and the CT image is displayed. The program then advances to step 117 wherein n is set to 1 again. In step 119, the delta projection data string array, X (n+300, m) (where m=1 through 512 and n=1 through 300) is read out from the external memory 29 and is transferred to Ym of the convolution unit 31. In step 121, the convolution unit 31 performs a convolution and stores the obtained result at Ym. In step 123, data at Ym is back-projected in superposition on the previous image at an angle of 360°/300°×(n−1). In step 125, the CT image is displayed. In step 127, the number of projections is incremented by 1. In step 129, it is determined if the number of projections has reached 300. If the number of projections is determined to be less than 300 in step 129, the program returns to step 119 and steps 119 through 129 are repeated until the data corresponding to 300 projections is back-projected.

FIGS. 11A through 11D show the processing flow chart when one full rotary scan (in the fan beam/parallel beam conversion system) is performed. First, in step 131, scanning is started. In step 133, the data acquisition is started. That is, the data of 300 projections (each projection corresponding to 512 channels) is read out from the data acquisition system 11. The readout data is written in the external memory 29 in the form of a two-dimensional data array Y (p, q) (where P=1 through 300 and q=1 through 512). In step 135, conversion of the fan beams into parallel beams is performed. That is, the 274 projection/512 channel parallel data is generated from the fan beam data of 300 projection/512 channel fan beam data. In step 137, the data strings for each of the 151st projection through the 274th projection are reversed in order. In step 139, the delta projection data string is obtained. In step 141, n is set to 1. In step 143, the data string of the first projection of 512 channels is read out from the extenal memory 29, and is transferred to Ym of the convolution unit 31. The convolution unit 31 performs a convolution and stores the obtained result in Ym in step 145. In step 147, data at Ym is back-projected at an angle of 180°/150°×(n−1)+15.6°. In step 149, the number of projections is incremented by 1. In step 151, it is determined if the number of projections has reached 150. If it is determined that the number of projections is less than 150, the program returns to step 143 and steps 143 to 151 are repeated until the data corresponding to 150 projections is back-projected. On the other hand, if the number of projections is determined to be 151 or more in step 151, the program advances to step 153 and the CT image is displayed. In step 155, n is set to 1 again. In step 157, the delta projection data string array, X (n+150, m) (where m=1 through 512) is read out from the external memory 29 and is transferred to Ym of the convolution unit 31. The convolution unit 31 performs a convolution and stores the obtained result in Ym in step 159. In step 161, data at Ym is back-projected in superposition to the previous image at an angle of 180°/150°×(n−1) +15.6°. In step 163, the CT image is displayed. In step 165, the number of projections is incremented by 1. In step 167, it is determined if the number of delta projection data strings has reached 124. If the number of delta projection data strings is determined to be less than 124 in step 167, the program returns to step 157, and steps 157 through 167 are repeated until the data corresponding to the 124 delta projection data string is back-projected.

FIGS. 12A through 12E show the processing flow chart of a reflection system with the fan beams (one rotation). First, in step 169, scanning is started. In step 171, the data acquisition is performed. That is, the data corresponding to 300 projections with one projection corresponding to 512 channels is read out from the data acquisition system 11. The readout data is stored in the external memory 29 in the form of a two-dimensional data string array, X (n, m) (where n=1 through 300 and m=1 through 512). In step 173, reflection is performed. Then, the reflection data string array, E(n, m) (where n=175 through 426 and m=1 through 512) is generated from the 300 projection/512 channel data. Then, in step 175, the A delta projection data string $D_A$ is generated. The difference between the 301st reflection data string and the first projection data string, the difference between the 302nd reflection data string and the second projection data string and so on, and finally the difference between the 426th reflection data string and the 126th projection data string are obtained. In step 177, the B delta projection data string $D_B$ is generated. That is, the difference between the 175th projection data string and the 175th reflection data string, the difference between the 176th projection data string and the 176th reflection data string, and so on and finally the difference between the 300th projection data string and the 300th reflection data string are obtained. The program then advances to step 179 wherein n is set to 1, that is, the pointer for specifying the number of projections is set to 1. In step 181, the data string of the first projection of 512 channels is read out from the external memory 29 and is supplied to Ym of the convolution unit 31. The convolution unit 31 performs a convolution and stores the obtained result in Ym in step 183. Next, in step 185, data at Ym is back-projected at an angle of $180/150° \times (n-1)$. In step 187, the number of projections is incremented by 1. In step 189, it is determined if the number of projections has reached 174. If it is determined in step 189 that the number of projections is less than 174, the program returns to step 181, and steps 181 to 189 are repeated until the data corresponding to 174 projections is back-projected. If the number of projections is determined to be 174 or more in step 189, the program advances to step 191 wherein the reflection data string array, E(n, m) (where m=1 through 512) is read out from the external memory 29 and is supplied to Ym of the convolution unit 31. In step 193, the reflection data string array, E(n, m) (where m=1 through 512) is subjected to convolution. In step 195, the convoluted reflection data string Ym is back-projected at an angle of $180/150° \times (n-1)$. In step 197, the projection pointer of the reflectiOn data string is incremented by 1. In step 199, it is determined if the number of projections has reached 300. If the number of projections is determined to be less than 300, the program returns to step 191, and steps 191 to 199 are repeated until the data corresponding to 300 projections is back-projected. If, on the other hand, it is determined in step 199 that the number of projections is 301 or more, the program advances to step 201 to display the back-projected CT image. In step 203, the projection pointer is set to 1. In step 205, the A delta projection data string array, $D_A$(n, m) is supplied to Ym of the convolution unit 31. In step 207, the convolution unit 31 performs a convolution and stores the obtained result in Ym. In step 209, data at Ym is back-projected in superposition on the previous image at an angle of $180/150° \times (n-1)$. In step 211, the B delta projection data string $D_B$ is read out from the external memory 29 and is transferred to Ym of the convolution unit 31. In step 213, the convolution unit 31 performs a convolution of the B delta projection data string $D_B$ and stores the obtained result in Ym. In step 215, data at Ym is back-projected in superposition on the previous image at an angle of $180/150° \times (n+173)$. In step 217, the back-projected CT image is displayed. In step 219, the number of projections is incremented by 1 and the program advances to step 221. In step 221, it is determined if the number of delta projection data strings has reached 126. If it is determined in step 221 that the number of delta projection data strings is less than 126, the program returns to step 205, and steps 205 through 221 are repeated until the data string corresponding to the 126 delta projection data string is back-projected.

In each of the embodiments of the present invention described above, the present invention can be practiced by obtaining the difference between each pair of data strings which oppose each other in position as the delta projection data string.

In the embodiments described above, the image is displayed at each projection. However, n groups of delta projection data strings may be back-projected all at once and CT images of an $n \times 2/150$ second time lag may by displayed.

In the embodiments described above, the subtraction unit is used to obtain the difference between the strings of projection data. However, it is also possible to store a control program having a function of the subtraction unit 35 in the program memory 27 and to perform subtractions according to this control program. The same applies to the convolution unit 31 and the back projection unit 33. Thus, it is possible to store control programs having the functions of these units in the program memory 27 and to perform convolution and back projection under control of these control programs.

It is also possible to store a control program having a function of the preprocessing unit 21 in the program memory 27 and to perform preprocessing according to this control program.

While the invention has been particularly shown and described with reference to a preferred embodiment thereof, it will be understood by those skilled in the art that various changes in form and details may be made therein without departing from the spirit and scope of the invention.

What is claimed is:

1. A method for reconstructing an image by a computed tomography device which obtains reconstruction image data corresponding to a plurality of dynamic images generated by projection data strings which are acquired by rotary scanning through an angle exceeding an angle corresponding to one reconstruction image, comprising the steps of:
   (a) acquiring a group of projection data strings, including time-serial projection data strings, corresponding to a desired reconstruction CT image and determining the difference between each said time-serial projection data string corresponding to said reconstruction CT image, and the respective projection data string corresponding in position therewith, to obtain differential data strings;
   (b) convolving and back-projecting the projection data strings to produce the reconstruction CT image; and
   (c) convolving the differential data strings and further back-projecting the convolved differential data on the reconstruction CT image which is obtained in the step (b).

2. A method according to claim 1, wherein said rotary scanning is performed by rotating parallel beams through an angle of more than 180°.

3. A method according to claim 1, wherein said rotary scanning is performed by rotating fan beams through an angle of more than 180°.

4. A method for reconstructing an image by a computed tomography device which obtains reconstruction image data corresponding to a plurality of dynamic images generated by projection data strings which are acquired by rotary scanning with parallel beams through an angle of more than 180°, comprising the steps of:

(a) acquiring a group of projection data strings, including time-serial projection data strings, corresponding to a desired reconstruction CT image;

(b) reversing in order a data string of projection data which corresponds in position to a respective time-serial projection data string of said group of projection data corresponding to said desired reconstruction CT image;

(c) determining the difference between each said time-serial projection data string, corresponding to said reconstruction CT image, and the respective projection data string corresponding in position therewith, to obtain differential data strings;

(d) convolving each said time-serial projection data string of said group of projection data strings corresponding to said prospective reconstruction CT image to obtain convolved time-serial projection data strings;

(e) back-projecting each said convolved time-serial projection data string;

(f) displaying said projection data back-projected in step (e);

(g) convolving said differential data to form convolved differential data;

(h) back-projecting said convolved differential data; and (i) displaying said projection data back-projected in step (h).

5. A method for reconstructing an image by a computed tomography device which obtains reconstruction image data corresponding to a plurality of dynamic images generated by projection data strings which are acquired by rotary scanning with fan beams through an angle of more than 360°, comprising the steps of:

(a) acquiring a group of projection data strings, including time-serial projection data strings, corresponding to a desired reconstruction CT image;

(b) determining the difference between each said time-serial projection data string corresponding to said reconstruction CT image, and the respective projection data string corresponding in position therewith, to obtain differential data strings;

(c) convolving each said time-serial projection data string of said group of projection data strings corresponding to said prospective reconstruction CT image to form convolved time-serial projection data strings;

(d) back-projecting each said convolved time-serial projection data string;

(e) displaying each said convolved time-serial data string back-projected in step (d);

(f) convolving said differential data strings to form convolved differential data strings;

(g) back-projecting said convolved differential data strings; and (h) displaying said convolved data strings back-projected in step (g).

6. A method for reconstructing an image by a computed tomography device which obtains reconstruction image data corresponding to a plurality of dynamic images generaled by projection data strings which are acquired by fan beams, comprising the steps of:

(a) acquiring a group of fan beam projection data strings, corresponding to a desired reconstruction CT image;

(b) converting said group of fan beam data strings acquired in step (a) into a group of parallel projection data strings, including corresponding time-serial projection data strings;

(c) reversing in order each said parallel projection data string which corresponds in position to a respective time-serial projection data string of said group of parallel projection data strings corresponding to said prospective reconstruction CT image;

(d) determining the difference between each said time-serial projection data string of said group of parallel projection data corresponding to said desired reconstruction CT image, and the respective parallel projection data string corresponding in position therewith to obtain differential data strings;

(e) convolving each said time-serial projection data string of said group of parallel projection data strings corresponding to said desired reconstruction CT image to form convolved time-serial projection data strings;

(f) back-projecting each said convolved time-serial projection data string;

(g) displaying each said convolved time-serial projection data string back-projected in step (f);

(h) convolving said differential data strings;

(i) back-projecting each said convolved differential data string; and (j) displaying each said convolved differential data string back-projected in step (i).

7. A method for reconstructing an image by a computed tomography device which acquires a plurality of dynamic images generated by projection data strings which are acquired by a fan beam, comprising the steps of:

(a) acquiring a group of fan beam projection data strings corresponding to a prospective reconstruction CT image, including time-serial projection data strings;

(b) converting said fan beam projection data strings acquired in step (a) into reflection data strings, including first and second reflected time-serial projection data strings, by reflection;

(c) determining the difference between each said first reflected time-serial projection data string, which corresponds to said prospective reconstruction CT image, and the respective fan beam projection data string corresponding in position therewith, to obtain first differential data strings;

(d) determining the difference between each said second reflected time-serial projection data string which corresponds to said prospective reconstruction CT image and the respective projection data string corresponding in position therewith, to obtain second differential data strings;

(e) convolving each said time-serial projection data string of said group of projection data corresponding to said prospective reconstruction CT image to form convolved time-serial projection data strings;

(f) back-projecting said convolved time-serial projection data strings;

(g) convolving said reflection data strings to form convolved reflection data strings;

(h) back-projecting said convolved reflection data strings;

(i) displaying the CT image of said convolved reflection data strings back-projected in step (h);

(j) convolving said first differential data strings to form first convolved differential data strings;

(k) back-projecting said first convolved differential data strings;

(l) convolving said second differential data strings to form second convolved differential data strings;

(m) back-projecting said second convolved differential data strings; and (n) displaying the CT images of said first and second convolved differential data strings back-projected in steps (k) and (m).

8. A computed tomography device for obtaining reconstruction image data of a plurality of dynamic images generated by projection data strings which are acquired by rotary scanning through an angle exceeding an angle corresponding to a reconstruction image, comprising:

(a) means, connected to said device, for generating X-rays for scanning a subject;

(b) means, connected to said device, for detecting the X-rays which are transmitted through the subject;

(c) means, electrically coupled to said means for detecting X-rays, for acquiring projection data strings, including time-serial projection data strings, from said X-ray detecting means;

(d) memory means, electrically coupled to said means for acquiring data for storing said projection data strings acquired by said projection data acquiring means;

(e) subtracting means, electrically coupled to said means for acquiring data and said memory means, for receiving said projection data strings from said projection data acquiring means and for determining the difference between each said time-serial projection data string, corresponding to a prospective reconstruction CT image, and a respective projection data string corresponding in position therewith, to obtain differential data strings;

(f) convolution means, electrically coupled to said memory means, said subtracting means and said means for acquiring data, for convolving said group of projection data strings and said differential data strings;

(g) means, electrically coupled to said convolution means and said means for acquiring data, for back-projecting said differential data strings on said reconstruction image data obtained by back projection of said projection data strings;

(h) means, electrically coupled to said means for acquiring data, for displaying a two-dimensional cross-sectional image which is reconstructed by said back-projecting means; and (i) controlling means, electrically coupled to said memory means, said subtracting means, said convolution means, said back projecting means and said displaying means, for controlling said memory means, said subtracting means, said convolution means, said back-projecting means and said displaying means.

9. A computed tomography device for obtaining reconstruction image data of a plurality of dynamic images generated by projection data strings, including time-serial projection data strings, which are acquired by rotary scanning through an angle exceeding an angle corresponding to a reconstruction image, comprising:

(a) means, connected to said device, for generating X-rays for scanning a subject;

(b) means, connected to said device, for detecting the X-rays which are transmitted through the subject;

(c) means, electrically coupled to said means for detecting, for acquiring projection data from said X-ray detecting means;

(d) computer system means, electrically coupled to said means for acquiring, for receiving said projection data strings from said projection data acquiring means, for determining the difference between each said time-serial projection data string corresponding to a prospective reconstruction CT image and a respective projection data string corresponding in position therewith and generating differential data strings, for convolving said group of projection data strings and said differential data strings, and for back-projecting said differential data strings on said reconstruction image data obtained by back projection of said projection data strings; and (e) means, electrically coupled to said computer system means, for displaying a two-dimensional crosssectional image which is reconstructed by said computer system means.

10. A device according to claim 9, wherein said computer system means includes a programmable computer, electrically coupled to said X-ray generating means, said X-ray detecting means, said projection data acquiring means and said displaying means, said programmable computer having a computer main body for receiving said projection data strings for acquiring said reconstruction image data, and a program memory device for storing a permanent program for said programmable computer so that said computer system means may execute a function, whereby said X-ray generating means, said X-ray detecting means, said projection data acquiring means and said displaying means are controlled so that said differential data strings representing the difference between each said time-serial projection data string of said group of projection data strings corresponding to said reconstruction image and the respective projection data string corresponding in position to each said time-serial projection data string of said group of projection data strings are obtained, and said differential data strings are back-projected on said reconstruction image data which is obtained by back projection of said group of projection data strings.

11. A device according to claim 8 or 9, wherein said rotary scanning is performed by rotating parallel beams through an angle of more than 180°.

12. A device according to claim 8 or 9, wherein said rotary scanning is performed by rotating fan beams through an angle of more than 180°.

13. A computed tomography device for obtaining reconstruction image data of a plurality of dynamic images generated by projection data strings which are obtained by rotary scanning with parallel beams through an angle of more than 180°, comprising:

(a) means, connected to said device, for acquiring a group of projection data strings, including time-serial projection data strings, corresponding to a desired reconstruction CT image;

(b) means, electrically coupled to said means for acquiring, for reversing the order of each said data string of said group of projection data strings which corresponds in position to a respective time-serial projection data string of said group of projection data strings corresponding to said desired reconstruction CT image;

(c) means, electrically coupled to said means for reversing and said means for acquiring, for determining the difference between each said time-serial projection data string of said group of projection data strings corresponding to said desired reconstruction CT image and the respective projection data string corresponding in position therewith, whereby differential data strings are obtained;

(d) means, electrically coupled to said means for acquiring, for convolving each said time-serial projection data string of said group of projection data strings corresponding to said desired reconstruction CT image;

(e) means, electrically coupled to said means for convolving, for back-projecting said differential data strings and each said time-serial projection data string after convolution; and (f) means, electrically coupled to said means for back-projecting, for displaying prospective reconstruction image data after back projection of said differential data strings and each said time-serial projection data string.

14. A computed tomography device for obtaining reconstruction image data of a plurality of dynamic images generated by projection data strings which are acquired by rotating fan beams through an angle of more than 360°, comprising:

(a) means, connected to said device, for acquiring a group of projection data strings, including time-serial projection data strings, corresponding to a desired reconstruction CT image;

(b) means, electrically coupled to said means for acquiring, for reversing the order of each said data string of said group of projection data strings which corresponds in position to a respective time-serial projection data string of said group of projection data strings corresponding to said desired reconstruction CT image;

(c) means, electrically coupled to said means for acquiring and said means for reversing, for determining the difference between each said time-serial projection data string of said group of projection data strings corresponding to said reconstruction CT image and the respective projection data string corresponding in position therewith, whereby differential data strings are obtained;

(d) means, electrically coupled to said means for acquiring and said means for determining the difference, for convolving each said time-serial projection data string of said group of projection data strings, corresponding to said prospective reconstruction image and for convolving said differential data strings;

(e) means, electrically coupled to said means for convolving, for back-projecting said differential data strings and each said time-serial projection data string after convolution; and (f) means, electrically coupled to said means for back-projecting, for displaying reconstruction CT image data after back projection of said differential data strings and each said time-serial projection data string.

15. A computed tomography device for obtaining reconstruction image data of a plurality of dynamic images generated by projection data strings which are acquired by fan beam, comprising:

(a) means, connected to said device, for acquiring a group of fan beam projection data strings, including time-serial projection data strings, corresponding to a desired reconstruction CT image;

(b) means, electrically coupled to said means for acquiring, for converting said group of fan beam projection data strings into a group of parallel data strings and for reversing in order each said data string of said group of projection data strings which corresponds in position to a respective time-serial projection data string of said group of parallel projection data strings corresponding to said desired reconstruction CT image;

(c) means, electrically coupled to said means for converting and reversing, for determining the difference between each said time-serial projection data string of said group of parallel projection data strings corresponding to said desired reconstruction CT image and the respective projection data string corresponding in position therewith, whereby differential data strings are obtained;

(d) means, electrically coupled to said means for converting and reversing and said means for determining, for convolving each said time-serial projection data string of said group of parallel projection data strings corresponding to said desired reconstruction image and for convolving said differential data strings;

(e) means, electrically coupled to said means for convolving, for back-projecting said differential data strings and each said time-serial projection data string after convolution; and (f) means, electrically coupled to said means for back-projecting, for displaying reconstruction image data after back projection of said differential data strings and each said time-serial projection data string.

16. A computed tomography device for obtaining a plurality of dynamic images generated by projection data strings which are acquired by fan beams, comprising:

(a) means, connected to said device, for acquiring a group of fan beam projection data strings, including first time-serial projection data strings and second time-serial projection data strings, corresponding to a desired reconstruction CT image;

(b) means, electrically coupled to said means for acquiring, for converting said fan beam projection data strings acquired in step (a) into reflection data strings by reflection;

(c) means, electrically coupled to said means for converting, for determining the difference between each said first time-serial projection data string of said group of fan beam projection data strings converted into reflection data strings which corresponds to said desired reconstruction CT image and the respective projection data string converted into a reflection data string corresponding in position therewith, whereby first differential data strings are obtained, and for determining the difference between each said second time-serial projection data string of said group of fan beam projection data strings converted into reflection data strings which corresponds to said desired reconstruction CT image and the respective projection data string converted into a reflected data string corresponding in position therewith, whereby second differential data strings are obtained;

(d) means, electrically coupled to said means for converting and said means for determining the difference, for convolving said group of fan beam projection data strings converted to reflected data strings corresponding to said desired reconstruction CT image and said first and second differential data strings;

(e) means, electrically coupled to said means for convoluting, for back-projecting said group of fan beam projection data strings converted to reflected data strings corresponding to said desired reconstruction CT image and for back-projecting said first and second differential data; and (f) means, electrically coupled to said means for back projecting, for displaying said back-projected reconstruction CT image.

* * * * *